US012690045B2

(12) United States Patent
Ryu et al.

(10) Patent No.: US 12,690,045 B2
(45) Date of Patent: Jul. 21, 2026

(54) PHYSICAL DOWNLINK CONTROL CHANNEL REPETITIONS IN A SLOT

(71) Applicant: QUALCOMM Incorporated, San Diego, CA (US)

(72) Inventors: Jae Ho Ryu, San Diego, CA (US);
Xiao Feng Wang, San Diego, CA (US);
Hobin Kim, San Diego, CA (US);
Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 18/169,691

(22) Filed: Feb. 15, 2023

(65) Prior Publication Data

US 2024/0276506 A1 Aug. 15, 2024

(51) Int. Cl.
*H04W 72/23* (2023.01)
*H04L 1/08* (2006.01)

(52) U.S. Cl.
CPC .............. *H04W 72/23* (2023.01); *H04L 1/08* (2013.01)

(58) Field of Classification Search
CPC ................................ H04L 1/08; H04W 72/23
USPC ........................................................ 370/329
See application file for complete search history.

800 ➞

(56) References Cited

U.S. PATENT DOCUMENTS

| | | | |
|---|---|---|---|
| 2022/0038210 A1 | 2/2022 | Liu et al. | |
| 2022/0240160 A1* | 7/2022 | Jang ...................... | H04L 1/1893 |
| 2023/0071326 A1* | 3/2023 | Zhang ................. | H04L 27/2602 |
| 2023/0075824 A1* | 3/2023 | Abdelghaffar ........ | H04L 5/0048 |
| 2023/0209569 A1* | 6/2023 | Matsumura .......... | H04B 7/0695 370/329 |
| 2023/0247640 A1 | 8/2023 | Mu | |
| 2024/0155623 A1* | 5/2024 | Abotabl ............ | H04W 72/0446 |
| 2025/0219790 A1* | 7/2025 | Singh .................. | H04W 72/231 |

FOREIGN PATENT DOCUMENTS

| | | | | |
|---|---|---|---|---|
| EP | 4451590 A2 * | 10/2024 | ........ | H04W 72/0446 |
| EP | 4478814 A2 * | 12/2024 | .......... | H04L 5/0055 |
| WO | 2021237427 A1 | 12/2021 | | |

OTHER PUBLICATIONS

International Search Report and Written Opinion—PCT/US2024/011988—ISA/EPO—Apr. 9, 2024.

* cited by examiner

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment may receive a first physical downlink control channel (PDCCH) repetition of a PDCCH in a slot. The UE may receive a second PDCCH repetition of the PDCCH in the slot. Numerous other aspects are described.

33 Claims, 20 Drawing Sheets

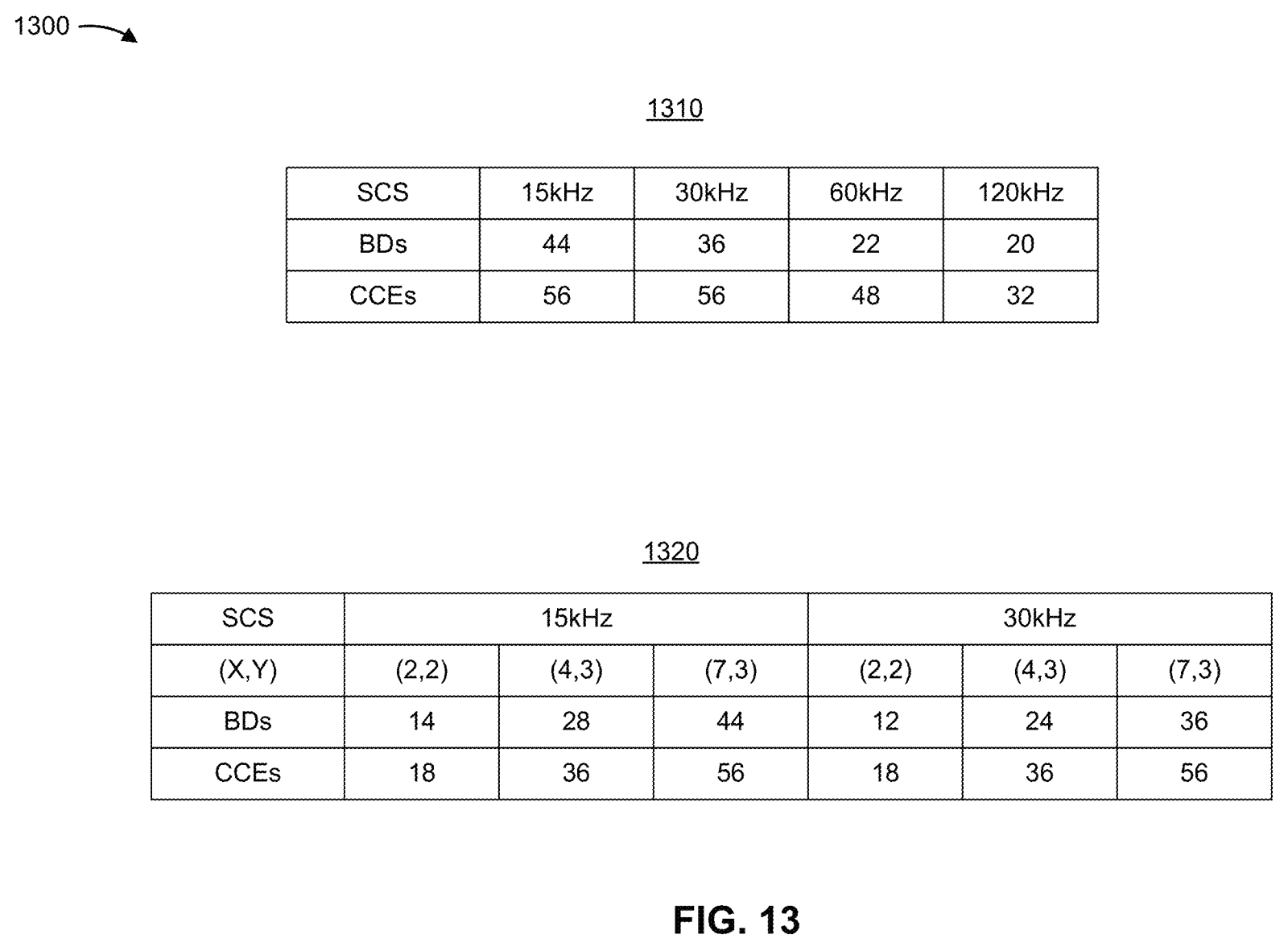

| SCS | 15kHz | 30kHz | 60kHz | 120kHz |
|-----|-------|-------|-------|--------|
| BDs | 44 | 36 | 22 | 20 |
| CCEs | 56 | 56 | 48 | 32 |

1320

| SCS | 15kHz | | 30kHz | |
|-----|-------|-------|-------|-------|
| (X,Y) | (2,2) | (4,3) | (7,3) | (2,2) | (4,3) | (7,3) |
| BDs | 14 | 28 | 44 | 12 | 24 | 36 |
| CCEs | 18 | 36 | 56 | 18 | 36 | 56 |

FIG. 13

1710 Receive a first physical downlink control channel (PDCCH) repetition of a PDCCH in a slot 1720 Receive a second PDCCH repetition of the PDCCH in the slot

1700

1810 Output a first PDCCH repetition of a PDCCH in a slot

1820 Output a second PDCCH repetition of the PDCCH in the slot

1800

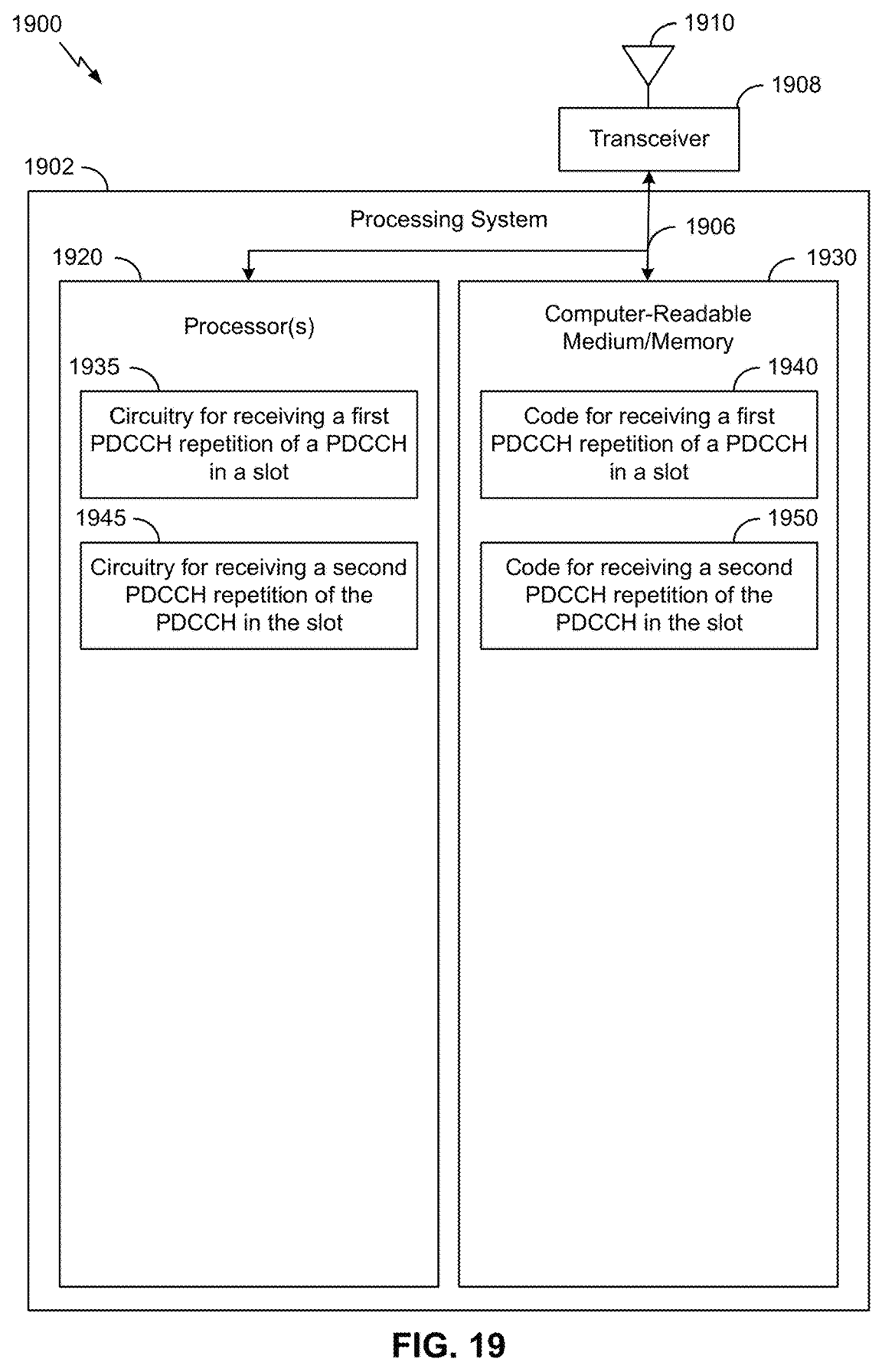

1900

1910

1908

Transceiver

1902

Processing System

1906

1920

1930

Processor(s)

Computer-Readable
Medium/Memory

1935

Circuitry for receiving a first
PDCCH repetition of a PDCCH
in a slot

1940

Code for receiving a first
PDCCH repetition of a PDCCH
in a slot

1945

Circuitry for receiving a second
PDCCH repetition of the
PDCCH in the slot

1950

Code for receiving a second
PDCCH repetition of the
PDCCH in the slot

FIG. 19

PHYSICAL DOWNLINK CONTROL CHANNEL REPETITIONS IN A SLOT

FIELD OF THE DISCLOSURE

Aspects of the present disclosure generally relate to wireless communication and to techniques and apparatuses for physical downlink control channel repetitions in a slot.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving a first physical downlink control channel (PDCCH) repetition of a PDCCH in a slot. The method includes receiving a second PDCCH repetition of the PDCCH in the slot.

Another aspect provides a method for wireless communication by a network entity. The method includes outputting a first PDCCH repetition of a PDCCH in a slot. The method may include outputting a second PDCCH repetition of the PDCCH in the slot.

Other aspects provide: an apparatus operable, configured, or otherwise adapted to perform any one or more of the aforementioned methods and/or those described herein with reference to and as illustrated by the drawings and specification; a non-transitory, computer-readable medium comprising computer-executable instructions that, when executed by a processor of an apparatus, cause the apparatus to perform the aforementioned methods and/or those described herein with reference to and as illustrated by the drawings and specification; a computer program product embodied on a computer-readable storage medium comprising code for performing the aforementioned methods and/or those described herein with reference to and as illustrated by the drawings and specification; and/or an apparatus comprising means for performing the aforementioned methods and/or those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 12 is a diagram illustrating an example of monitoring occasion configurations for PDCCH repetitions in the same slot that are in different linked SSSs, in accordance with the present disclosure.

FIG. 13 is a diagram illustrating an example associated with limits on the quantity of non-overlapping control channel elements (CCEs) and/or limits on the quantity of blind decodes (BDs), in accordance with the present disclosure.

FIG. 19 is a diagram illustrating an example of an implementation of code and circuitry for a communications device, in accordance with the present disclosure.

DETAILED DESCRIPTION

Figure 1:
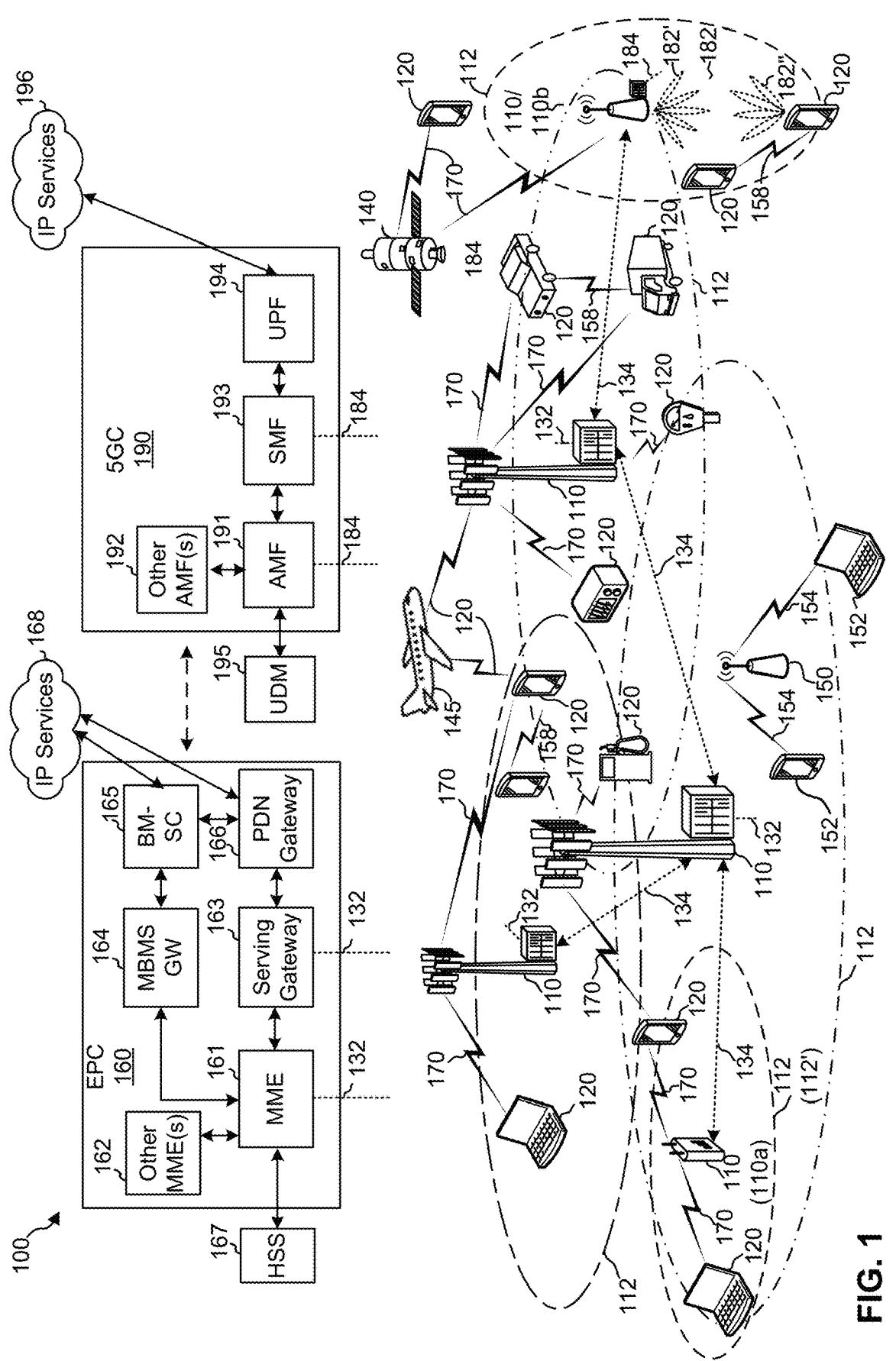
FIG. 1 depicts an example of a wireless communications network, in accordance with the present disclosure.

Aspects of the present disclosure provide apparatuses, methods, processing systems, and computer-readable mediums for physical downlink control channel repetitions in a slot.

A base station may transmit a physical downlink control channel (PDCCH) (which may include control information, such as downlink control information (DCI)) based at least in part on a search space set (SSS). A search space set may correspond to one or more locations of one or more PDCCH candidates, in the time domain, at which a PDCCH may be located. Each candidate may be associated with one or more control channel elements (CCEs). A CCE may be composed of multiple resource element groups (REGs). A REG may include one resource block and one orthogonal frequency division multiplexing (OFDM) symbol. One or more search space sets may be associated with a control resource set (CORESET).

An SSS may specify an aggregation level, which may be configured to correspond to a particular quantity of PDCCH candidate locations. For example, an aggregation level n may correspond to a quantity m of PDCCH candidate locations. For a type0-PDCCH search space, if the aggregation level is 4, then the corresponding maximum quantity of PDCCH candidates may be 4; if the aggregation level is 8, then the corresponding maximum quantity of PDCCH candidates may be 2; and if the aggregation level is 16 (which may be the maximum possible aggregation level), then the corresponding maximum quantity of PDCCH candidates may be 1. For other search spaces, the number of candidates for each aggregation level may be configured by a parameter (e.g., SearchSpace) contained in a system information block 1 (SIB1) or configured via a dedicated radio resource control (RRC) configuration.

In some cases, a base station may flexibly schedule and transmit the PDCCH. In other words, transmission of the PDCCH may not be limited to a particular set of frequency resources and/or time resources in a given radio frame. PDCCH frequency domain and time domain resources are configured on a per CORESET basis. Thus, once a user equipment (UE) is configured with a CORESET, the UE has information that identifies which resource blocks in the frequency domain are assigned to a search space set associated with the CORESET, as well as information that identifies a number of consecutive symbols occupied by the search space set.

A UE may communicate with multiple transmission and reception points (mTRPs). More generally, the UE may receive CORESET configurations associated with two or more transmission and reception points (TRPs)). A TRP is a communication point associated with a next generation NodeB (gNB or gNodeB). For example, a gNB may control mTRPs, and may use the mTRPs for spatially diverse communication with a UE, or may use a single TRP for communication with a UE.

In some cases, mTRP deployments may use PDCCH repetition. PDCCH repetition may involve transmission of multiple transmissions of a PDCCH. Upon receiving multiple PDCCH repetitions, the UE may perform one or more operations (e.g., an analysis, such as a log likelihood ratio (LLR) computation, a combination of PDCCH repetitions, or the like) to help ensure the reliability of the PDCCH. For example, TRPs in an mTRP deployment may output PDCCH repetitions in respective search space sets (SSSs) associated with respective CORESETs. The candidates that carry the PDCCH repetitions may be explicitly linked via an RRC configuration (e.g., the SearchSpaceLinkingId parameter)

However, linked SSSs may be limited to transmitting PDCCH repetitions in UE-specific search spaces (USSs), such as unicast transmissions. As a result, SSS linking may not be configured for PDCCH repetitions in common search spaces (CSSs), such as broadcast transmissions. Therefore, networks that may have poor downlink coverage, such as non-terrestrial networks (NTNs), may be unable to broadcast PDCCH repetitions. Such networks may broadcast unreliable PDCCH transmissions.

Some techniques described herein relate to transmission of multiple PDCCH repetitions (e.g., broadcast PDCCH repetitions) within the same slot. The PDCCH repetitions may be located in the same SSS or in respective SSSs. In cases where the PDCCH repetitions are located in the same SSS, the PDCCH repetitions may be transmitted in respective spans of the same slot. In cases where the PDCCH repetitions are located in the different SSSs, the PDCCH repetitions may be transmitted in respective linked SSSs of the same slot.

Transmitting PDCCH repetitions in the same slot may provide a mechanism by which PDCCH repetitions may be broadcast, which may improve the reliability of network transmissions of PDCCHs over networks that do not implement such mechanisms. For example, an NTN entity may broadcast PDCCH repetitions in a CSS, which may improve the reliability of the NTN. Using the same SSS to transmit the PDCCH repetitions may reduce signaling overhead, while using different SSSs to transmit the PDCCH repetitions may offer increased flexibility in the transmission of the PDCCH repetitions within the slot.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, BS, a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a gNB, an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
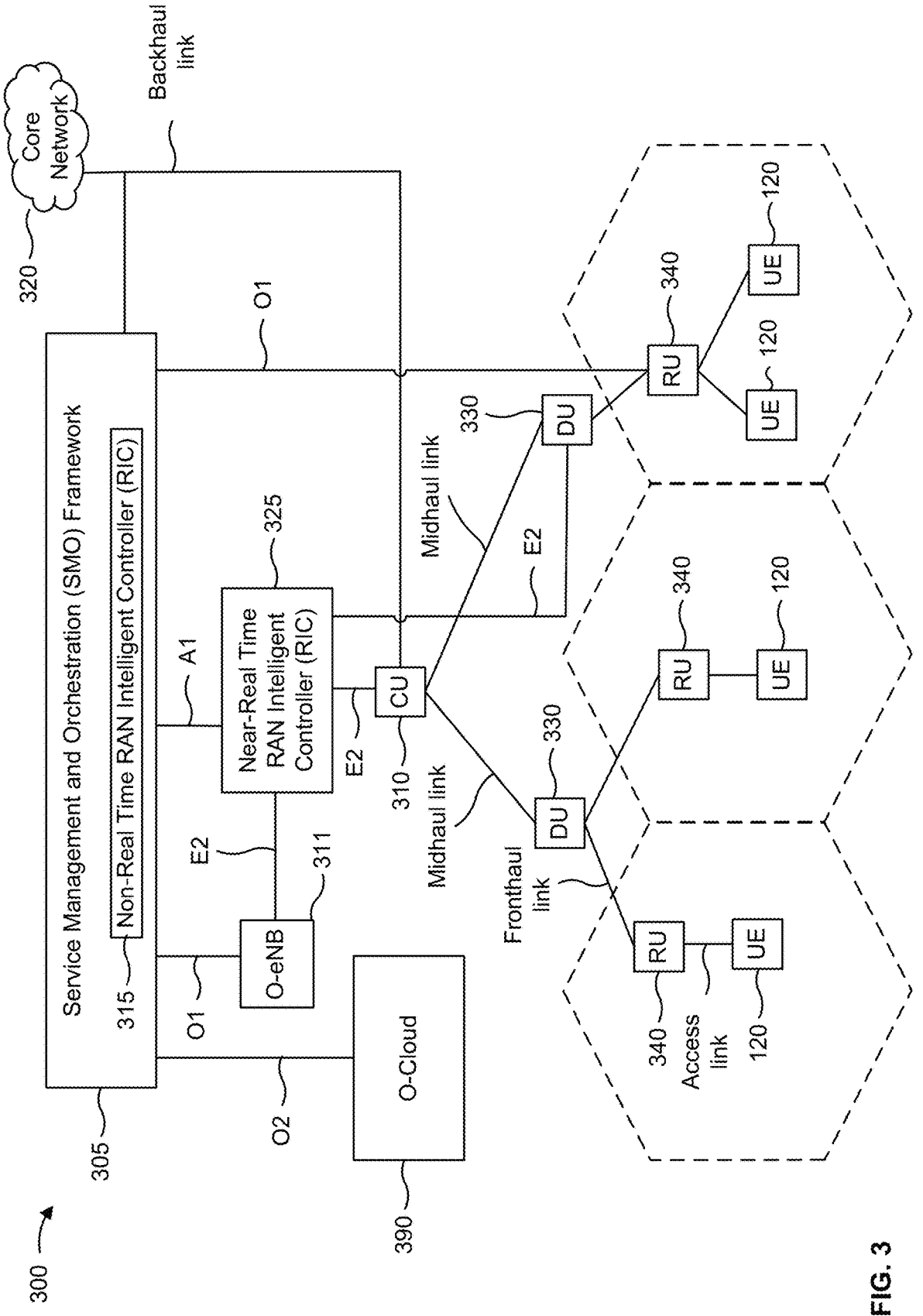
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a TRP, or a combination thereof, to name a few examples.

In some aspects, the wireless network 100 may include one or more NTN deployments in which a non-terrestrial wireless communication device may include a network node (referred to herein as a "NTN node") and/or a relay station (referred to herein, interchangeably, as a "non-terrestrial relay station"). As used herein, "NTN" may refer to a network for which access is facilitated by a non-terrestrial network node and/or a non-terrestrial relay station.

The wireless network 100 may include any number of non-terrestrial wireless communication devices. A non-terrestrial wireless communication device may include a satellite or a high-altitude platform (HAP). An HAP may include a balloon, a dirigible, an airplane, and/or an unmanned aerial vehicle. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of network nodes (e.g., stationary or ground-based network nodes), relay stations, and/or one or more components and/or devices included in a core network of wireless network 100.

As indicated above, FIG. 1 is provided as an example. Other examples may differ from what is described with regard to FIG. 1.

Figure 2:
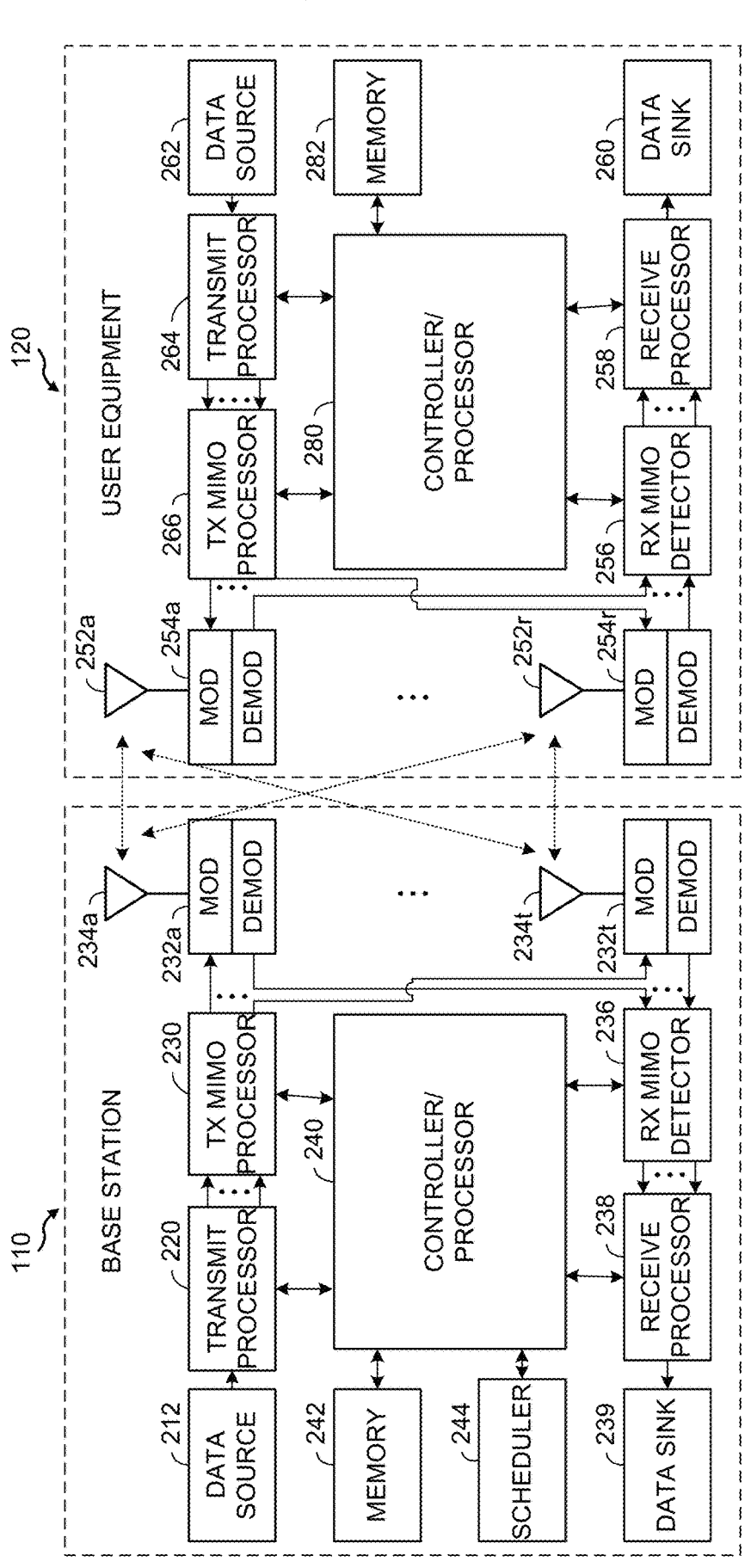
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the PDCCH, the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a-232t*. Each modulator in transceivers 232*a-232t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a-232t* may be transmitted via the antennas 234*a-234t*, respectively.

UE 120 includes antennas 252*a-252r* that may receive the downlink signals from the BS 110 and may provide received signals to the demodulators (DEMODs) in transceivers 254*a-254r*, respectively. Each demodulator in transceivers 254*a-254r* may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254*a-254r*, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a-254r* (e.g., for SC-FDM), and transmitted to BS 110.

At BS 110, the uplink signals from UE 120 may be received by antennas 234*a-234t*, processed by the demodulators in transceivers 232*a-232t*, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting"

may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-UP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
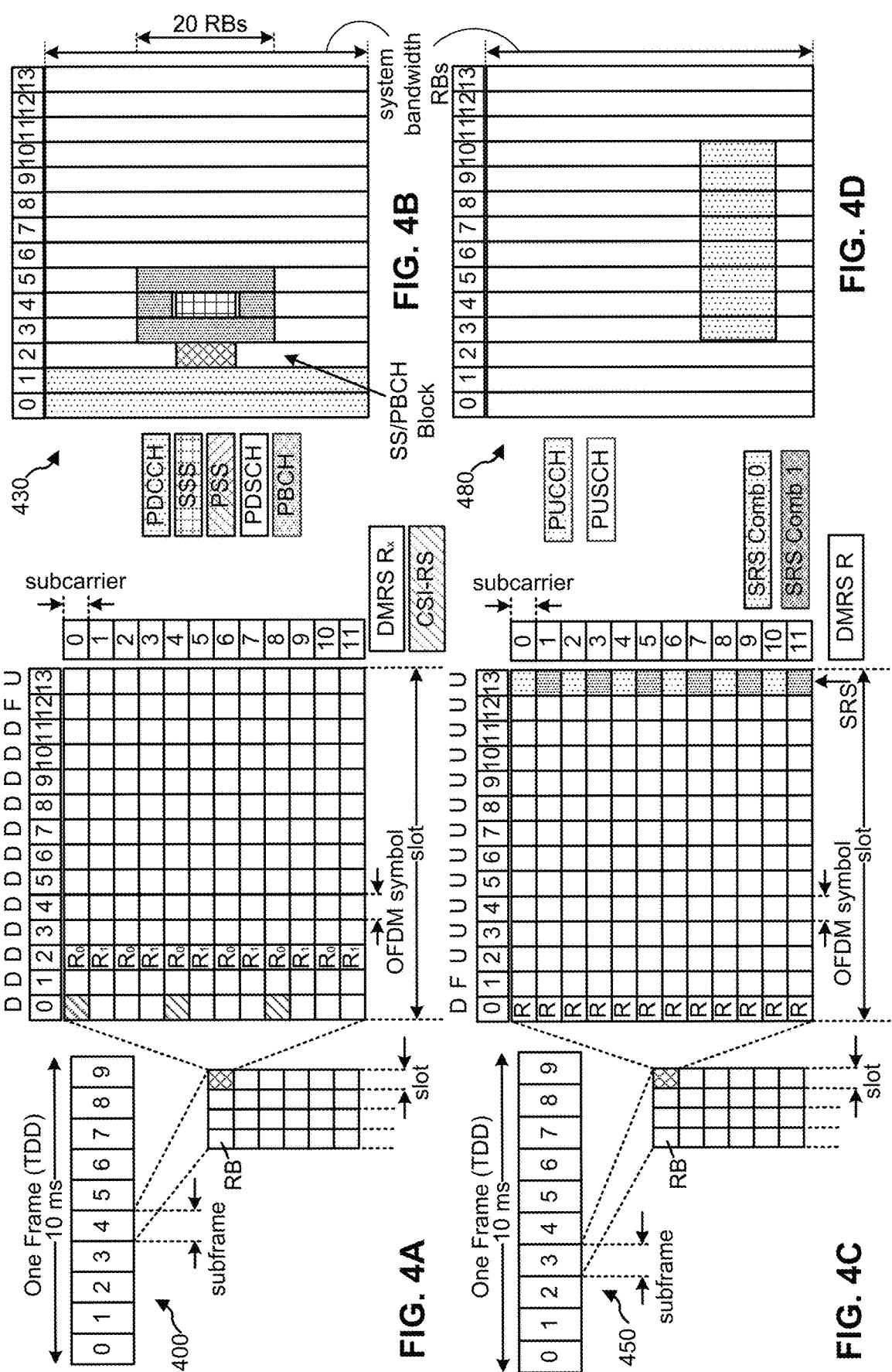
FIGS. 4A, 4B, 4C, and 4D depict aspects of data structures for a wireless communications network, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize OFDM with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
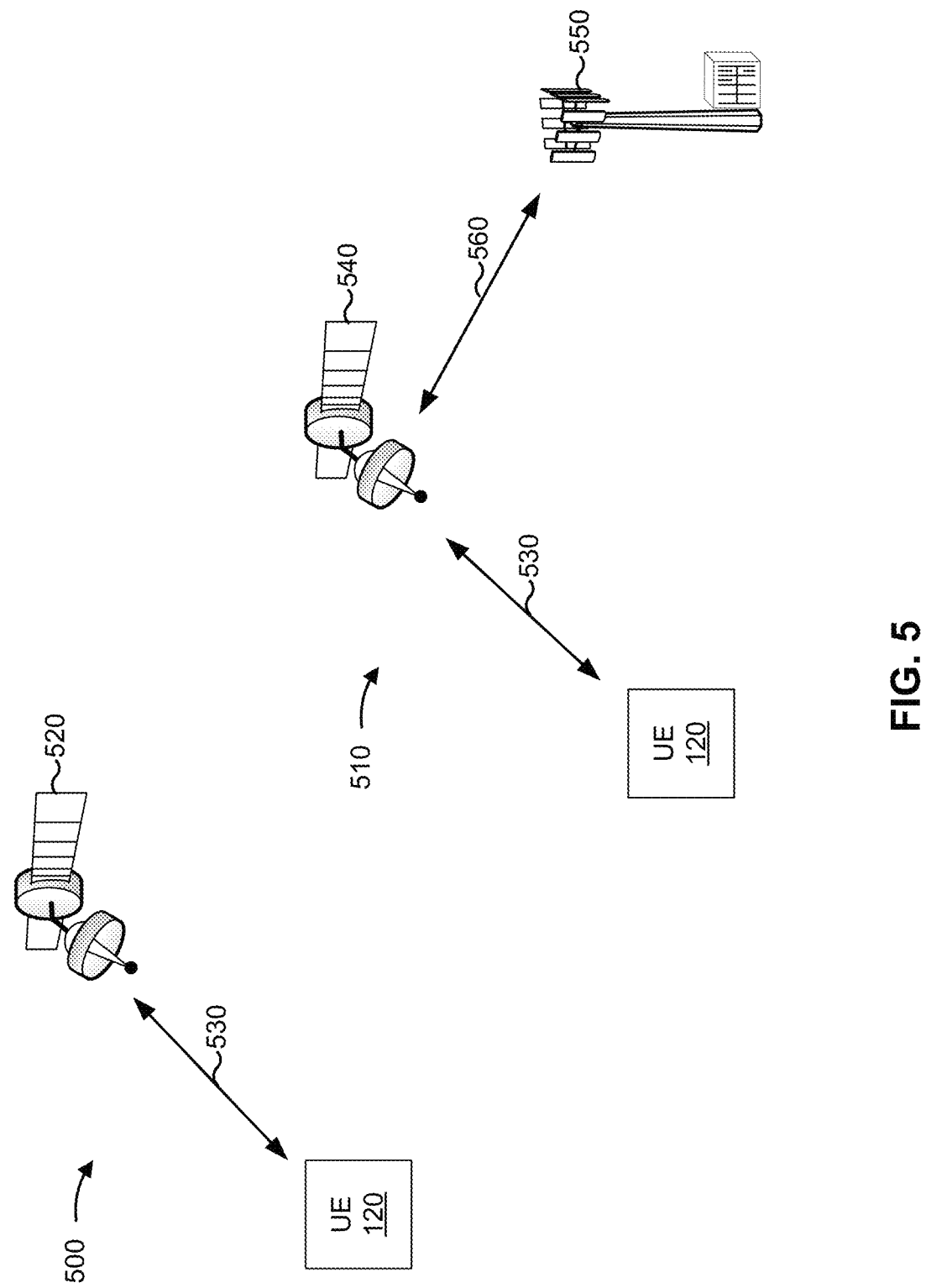
FIG. 5 is a diagram illustrating an example of a regenerative satellite deployment and an example of a transparent satellite deployment in a non-terrestrial network, in accordance with the present disclosure.

FIG. 5 is a diagram illustrating an example 500 of a regenerative satellite deployment and an example 510 of a transparent satellite deployment in an NTN, in accordance with the present disclosure.

Example 500 shows a regenerative satellite deployment. In example 500, a UE 120 is served by a satellite 520 via a service link 530. For example, the satellite 520 may include a base station 110 (e.g., BS 110a), a gNB, or the like. In some aspects, the satellite 520 may be referred to as a non-terrestrial base station, a regenerative repeater, and/or an on-board processing repeater. In some aspects, the satellite 520 may demodulate an uplink radio frequency signal and may modulate a baseband signal derived from the uplink radio signal to produce a downlink radio frequency transmission. The satellite 520 may transmit the downlink radio frequency signal on the service link 530. The satellite 520 may provide a cell that covers the UE 120.

Example 510 shows a transparent satellite deployment, which may also be referred to as a bent-pipe satellite deployment. In example 510, a UE 120 is served by a satellite 540 via the service link 530. The satellite 540 may be a transparent satellite. As used herein, "transparent satellite" (e.g., satellite 540) refers to any satellite that relays signals received from a base station or gateway (e.g., gateway 550) to a UE (e.g., UE 120) and/or relays signals received from a UE (e.g., UE 120) to a base station or gateway (e.g., gateway 550). The satellite 540 may relay a signal received from a gateway 550 via a feeder link 560. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 530 to a frequency of the uplink radio frequency transmission on the feeder link 560, and the satellite may amplify and/or filter the uplink radio frequency transmission. In some aspects, the UEs 120 shown in example 500 and example 510 may be associated with a Global Navigation Satellite System (GNSS) capability and/or a Global Positioning System (GPS) capability, though not all UEs have such capabilities. The satellite 540 may provide a cell that covers the UE 120.

The service link 530 may include a link between the satellite 540 and the UE 120, and may include one or more of an uplink or a downlink. The feeder link 560 may include a link between the satellite 540 and the gateway 550, and may include one or more of an uplink (e.g., from the UE 120 to the gateway 550) or a downlink (e.g., from the gateway 550 to the UE 120).

In some aspects, a device, such as an aircraft, drone, blimp, and/or hot air balloon, among other examples, may be used instead of or in addition to the transparent satellite 540 to relay signals received from a base station or gateway to a UE and/or relay signals received from a UE to a base station or gateway.

As indicated above, FIG. 5 is provided as an example. Other examples may differ from what is described with regard to FIG. 5.

Figure 6:
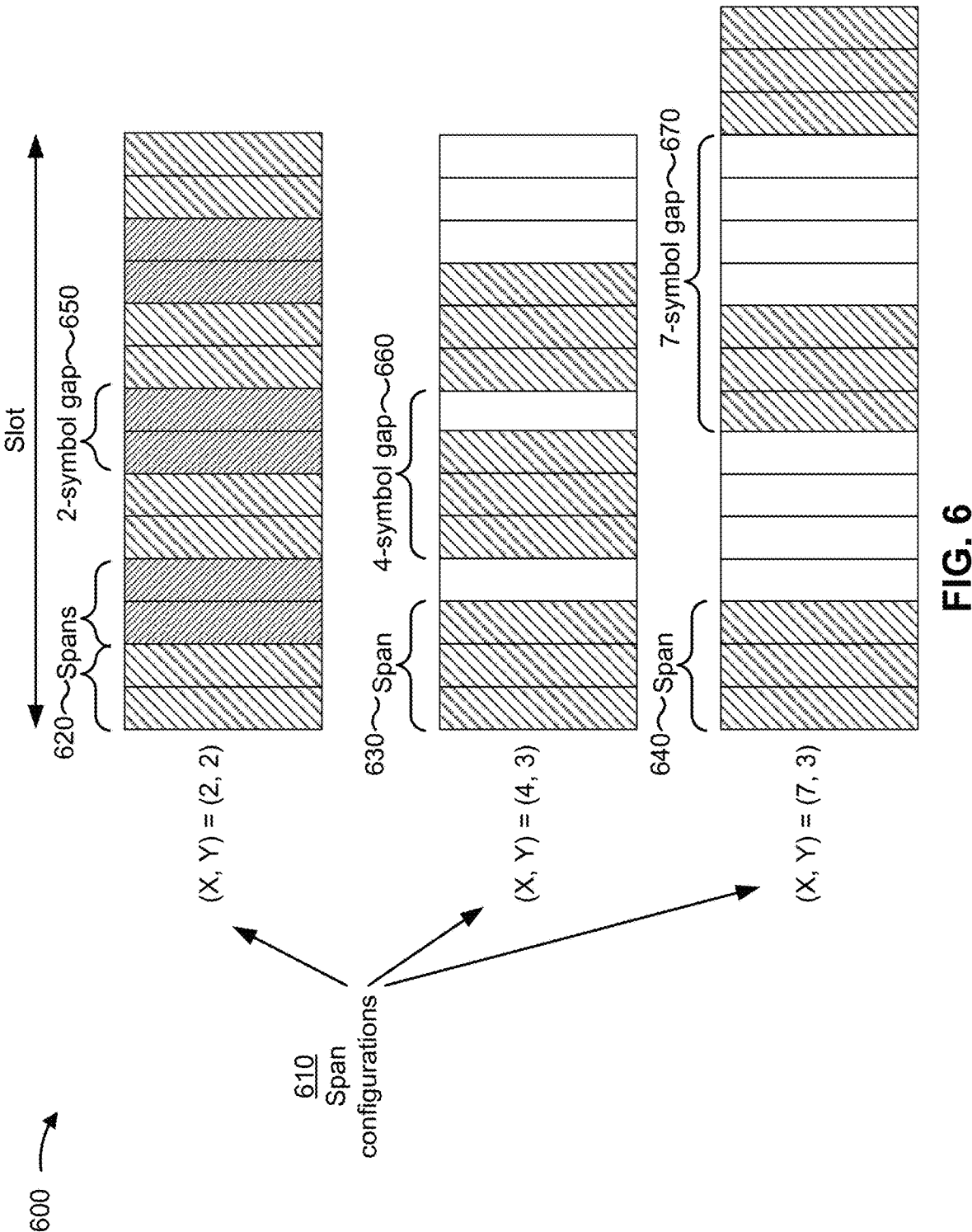
FIG. 6 is a diagram illustrating an example of spans in a slot for physical downlink control channel (PDCCH) monitoring, in accordance with the present disclosure.

FIG. 6 is a diagram illustrating an example 600 of spans in a slot for PDCCH monitoring, in accordance with the present disclosure. A slot may include multiple spans, and a span can include one or more PDCCH candidates. FIG. 6 shows a set of slots that are associated with respective span configurations, shown by reference number 610. A span configuration (X,Y) may identify a minimum gap X between two symbols (e.g., the starting symbols) of two spans and a maximum span duration Y.

The spans corresponding to span configurations (2, 2), (4, 3), and (7, 3) are shown by reference numbers 620, 630, and 640, respectively. The spans shown by reference number 620 are shown using alternating diagonal hatching, since these spans are adjacent to each other and would be difficult to differentiate otherwise. The spans shown by reference numbers 630 and 640 are separated by symbols that are not included in a span, which are shown by white rectangles.

The minimum gap X is shown for span configurations (2, 2), (4, 3), and (7, 3) by reference numbers 650, 660, and 670, respectively. It should be noted that X defines a minimum gap, so starting symbols of a pair of spans associated with span configuration (2, 2) may be two or more symbols apart from each other. Furthermore, the maximum span duration Y defines a maximum span duration, so the span 630 may have one-symbol or two-symbol spans while still being within the definition of the span configuration (4, 3).

As indicated above, FIG. 6 is provided as an example. Other examples may differ from what is described with respect to FIG. 6.

Figure 7:
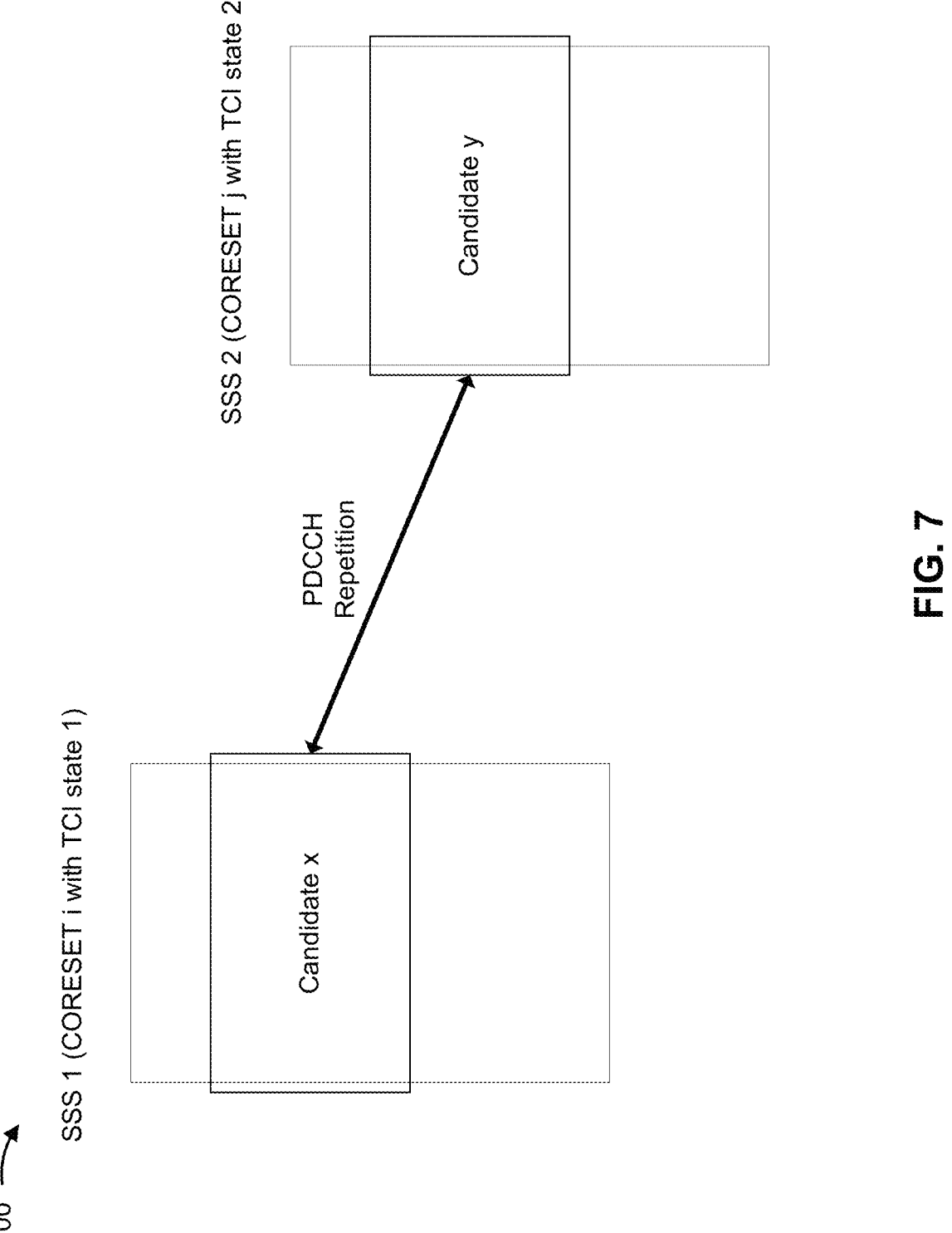
FIG. 7 is a diagram illustrating an example of linked search space sets (SSSs) carrying respective PDCCH repetitions, in accordance with the present disclosure.

FIG. 7 is a diagram illustrating an example 700 of linked SSSs carrying respective PDCCH repetitions, in accordance with the present disclosure. Example 700 may involve PDCCH repetition for mTRP deployments. FIG. 7 illustrates two linked SSSs, SSS 1 and SSS 2. SSS 1 is associated with CORESET i and transmission configuration indicator (TCI) 1, and SSS 2 is associated with CORESET j and TCI state 2. SSS 1 carries a first PDCCH repetition in a first PDCCH candidate (candidate x), and SSS 2 carries a second PDCCH repetition in a second PDCCH candidate (candidate y). PDCCH candidate x and PDCCH candidate y may be transmitted by respective TRPs in an mTRP deployment, and may be explicitly linked via an RRC configuration (e.g., the SearchSpaceLinkingId parameter). SSS 1 and SSS 2 may have many of the same features (e.g., SSS type, such as CSS or USS; monitored DCI format; quantity of candidates for each aggregation level; CORESET duration; SSS periodicity and slot offset; and quantity of monitoring occasions within a slot).

SSS 1 and SSS 2 may be limited to transmitting PDCCH repetitions in USSs, such as unicast transmissions, and may not be configured for PDCCH repetitions in CSSs, such as broadcast transmissions. For example, SSS linking may not be configured for: SSS 0, searchSpaceSIB1, searchSpaceOtherSystemInformation, pagingSearchSpace, ra-SearchSpace, searchSpaceBroadcast, peiSearchSpace, sdt-SearchSpace, or the like. Therefore, networks that may have poor downlink coverage, such as NTNs, may be unable to broadcast PDCCH repetitions using the linked SSS techniques illustrated in FIG. 7. Such networks may broadcast unreliable PDCCH transmissions.

As indicated above, FIG. 7 is provided as an example. Other examples may differ from what is described with respect to FIG. 7.

Figure 8:
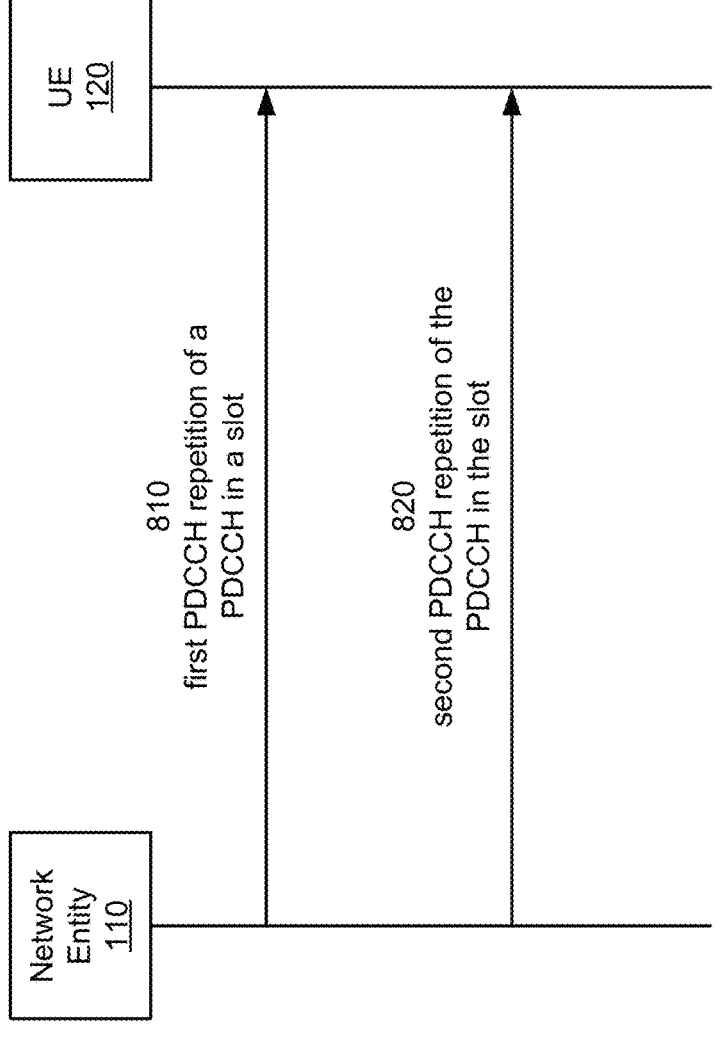
FIG. 8 is a diagram illustrating an example associated with PDCCH repetitions in a slot, in accordance with the present disclosure.

FIG. 8 is a diagram illustrating an example 800 associated with PDCCH repetitions in a slot, in accordance with the present disclosure. As shown in FIG. 8, example 800 includes communication between a network entity 110 (e.g., an NTN entity or a terrestrial network entity) and a UE 120. In some aspects, network entity 110 and UE 120 may be included in a wireless network, such as wireless network 100. Network entity 110 and UE 120 may communicate via a wireless access link, which may include an uplink and a downlink.

As shown in FIG. 8, and by reference number 810, the network entity 110 may output, and the UE 120 may receive, a first PDCCH repetition of a PDCCH in a slot. In some examples, the first PDCCH repetition may be located in a first SSS.

As further shown in FIG. 8, and by reference number 820, the network node may output, and the UE may receive, a second PDCCH repetition of the PDCCH in the slot (e.g., the same slot that contains the first PDCCH repetition). In some examples, the second PDCCH repetition may be located in the first SSS (e.g., the same SSS where the first PDCCH repetition is located) or in a second SSS (e.g., an SSS that is different from the first SSS, where the first PDCCH repetition is located). As used herein, a "first PDCCH repetition" and a "second PDCCH repetition" may not imply the existence of a third PDCCH. For example, the second PDCCH repetition may be a repetition of the first PDCCH repetition, or vice versa.

Transmitting PDCCH repetitions in the same slot may provide a mechanism by which PDCCH repetitions may be broadcast, which may improve the reliability of network transmissions of PDCCHs over networks that do not implement such mechanisms. For example, an NTN entity may broadcast PDCCH repetitions in a CSS, which may improve the reliability of the NTN. Using the same SSS to transmit the PDCCH repetitions may reduce signaling overhead, while using different SSSs to transmit the PDCCH repetitions may offer increased flexibility in the transmission of the PDCCH repetitions within the slot.

As indicated above, FIG. 8 is provided as an example. Other examples may differ from what is described with respect to FIG. 8.

Figure 9:
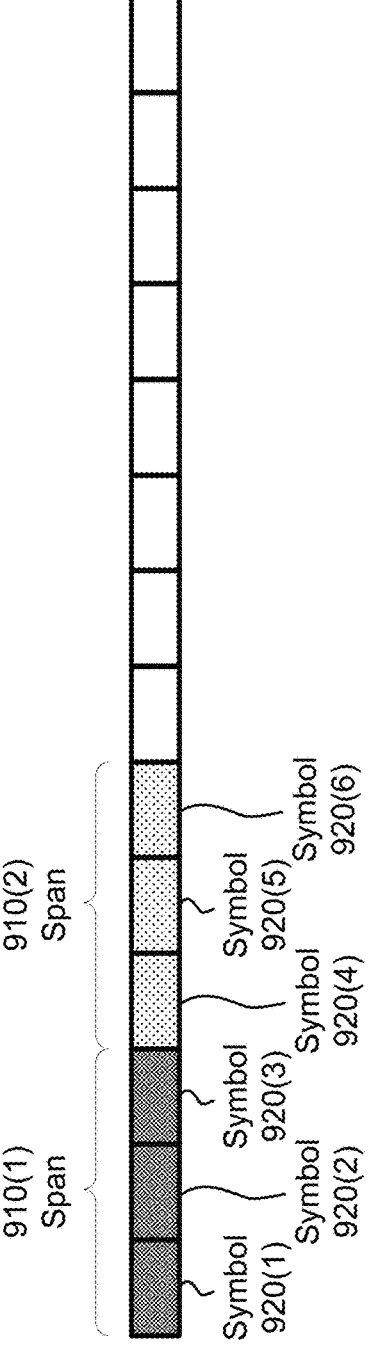
FIG. 9 is a diagram illustrating an example associated with PDCCH repetitions in a slot that are in the same SSS, in accordance with the present disclosure.

FIG. 9 is a diagram illustrating an example 900 associated with PDCCH repetitions in a slot that are in the same SSS, in accordance with the present disclosure. FIG. 9 depicts a slot that contains a plurality of symbols. In some examples, a network entity may output, and a UE may receive, the slot.

The slot includes span 910(1) and span 910(2). Span 910(1) contains symbols 920(1)-920(3) and span 910(2) contains symbols 920(4)-920(6). A first PDCCH repetition of a PDCCH is in span 910(1) and a second PDCCH repetition of the PDCCH is in span 910(2). In example 900, the first PDCCH repetition and the second PDCCH repetition are located in the same SSS. Using the same SSS to transmit the PDCCH repetitions may reduce signaling overhead.

As shown, span 910(1) is an initial span in the slot. An initial symbol of span 910(1) (e.g., symbol 920(1)) may be a first reference symbol for PDCCH reception. Span 910(2) is a final span in the slot. A final symbol of span 910(2) (e.g., symbol 920(6)) may be a second reference symbol for PDCCH reception. For example, the first reference symbol and the second reference symbol may enable a UE to process the first PDCCH repetition and the second PDCCH repetition.

In some examples, a network entity may output, and a UE may receive, an indication of a parameter that identifies a quantity of PDCCH repetitions in the slot. For example, if the first PDCCH repetition in span 910(1) and the second PDCCH repetition in span 910(2) are the only PDCCH repetitions in the slot, the parameter may identify the quantity of PDCCH repetitions in the slot as two. The parameter may be "PDCCHRepWithinSlot=N," where N is a quantity of consecutive monitoring occasions for the PDCCH repetitions within the slot. The parameter may be included in the SearchSpace information element (IE). The parameter may enable the network entity to configure the UE according to the quantity of PDCCH repetitions in the slot, and may enable the UE to process each PDCCH repetition in the slot.

As indicated above, FIG. 9 is provided as an example. Other examples may differ from what is described with respect to FIG. 9.

Figure 10:
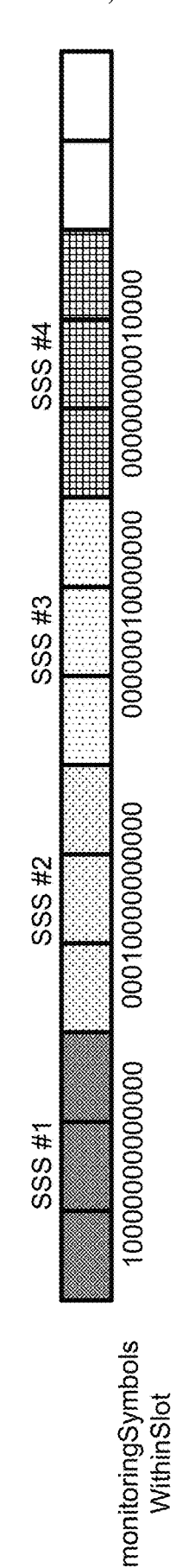
FIG. 10 is a diagram illustrating an example associated with PDCCH repetitions that are in different SSSs, in accordance with the present disclosure.

FIG. 10 is a diagram illustrating an example 1000 associated with PDCCH repetitions that are in different SSSs, in accordance with the present disclosure. In some examples, a network entity may output, and a UE may receive, the slot. Each PDCCH repetition is located in a different SSS (SSSs 1-4).

SSSs 1-4 may be linked. For example, the network entity may configure multiple SSSs within a slot (e.g., using the searchSpaceLinkingId parameter). The network entity may configure the PDCCH repetitions with linked SSSs 1-4 for CSSs (e.g., type0, type 0A, type 0B, type 2, type 2A, type 3, or the like) and/or for USSs. The network entity may specify PDCCH repetition over any suitable quantity of linked SSSs. For example, the quantity of linked SSSs may be greater than two. For instance, in example 1000, the quantity of linked SSSs may be four (corresponding to SSSs 1-4). Using different SSSs to transmit the PDCCH repetitions may offer increased flexibility in the transmission of the PDCCH repetitions within the slot.

SSSs 1-4 may be associated with the same CORESET. The network entity may configure SSSs 1-4 with identical parameters associated with the CORESET. For example, the network entity may configure SSSs 1-4 with the same: monitoring slot periodicity and offset (e.g., where the periodicity is a multiple of the slots); duration; quantity of candidates per aggregation level; and SS type.

However, the PDCCH repetitions may have different monitoring symbols within the slot. For example, the network entity may output, and the UE may receive, an indication of one or more parameters (e.g., "monitoringSymbolsWithinSlot") that indicate respective locations of the PDCCH repetitions in the slot. For example, as shown, the parameter(s) for the PDCCH repetitions may be sequences of bits, with a "1" indicating the location within the slot of the first symbol of a PDCCH repetition. The parameter(s) may enable the network entity to configure the UE based on the locations of the PDCCH repetitions in the slot, and may enable the UE to process each PDCCH repetition in the slot.

As indicated above, FIG. 10 is provided as an example. Other examples may differ from what is described with respect to FIG. 10.

Figure 11:
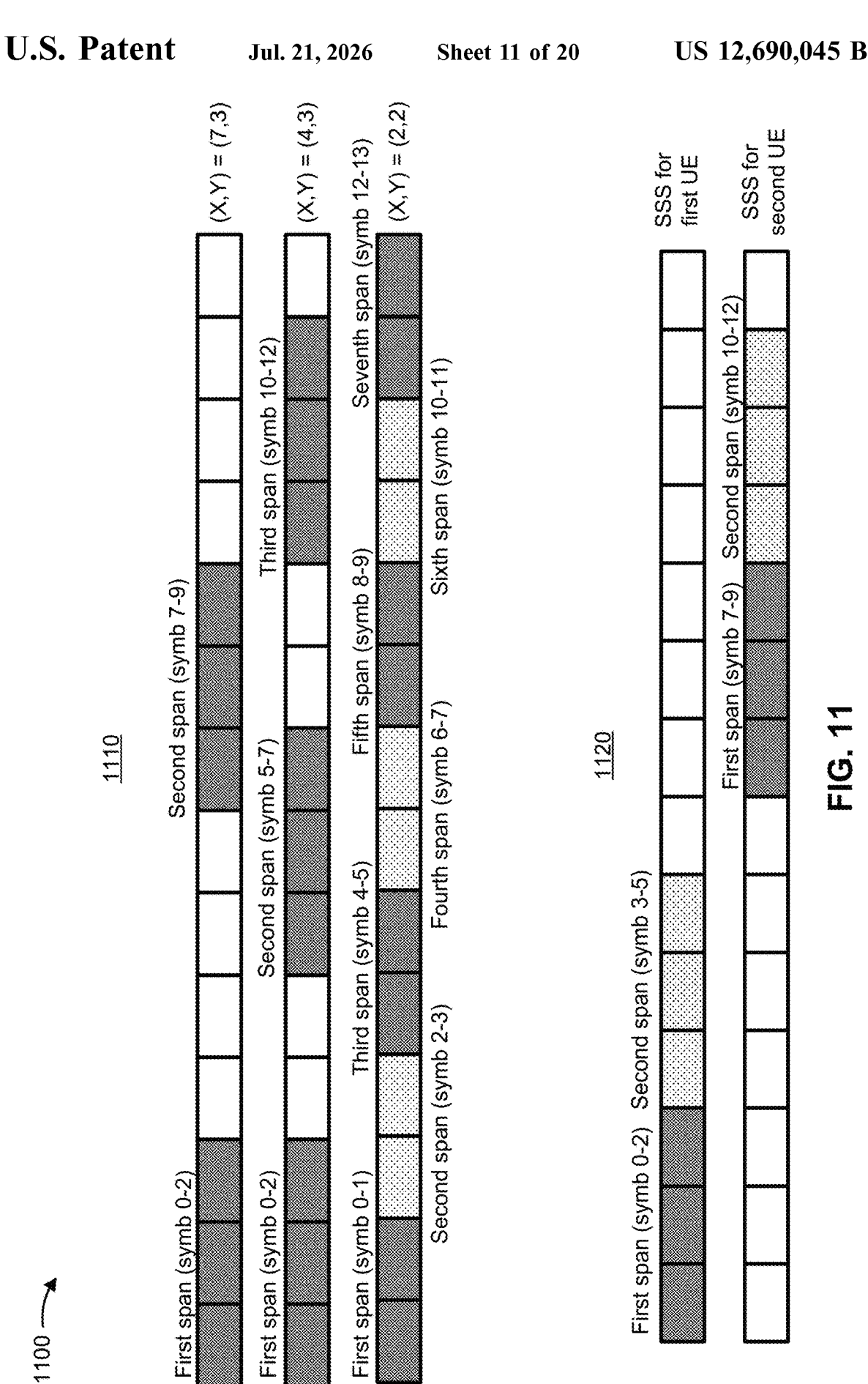
FIG. 11 is a diagram illustrating an example of monitoring occasion configurations for PDCCH repetitions in the same slot that are in the same SSS, in accordance with the present disclosure.
Figure 12:
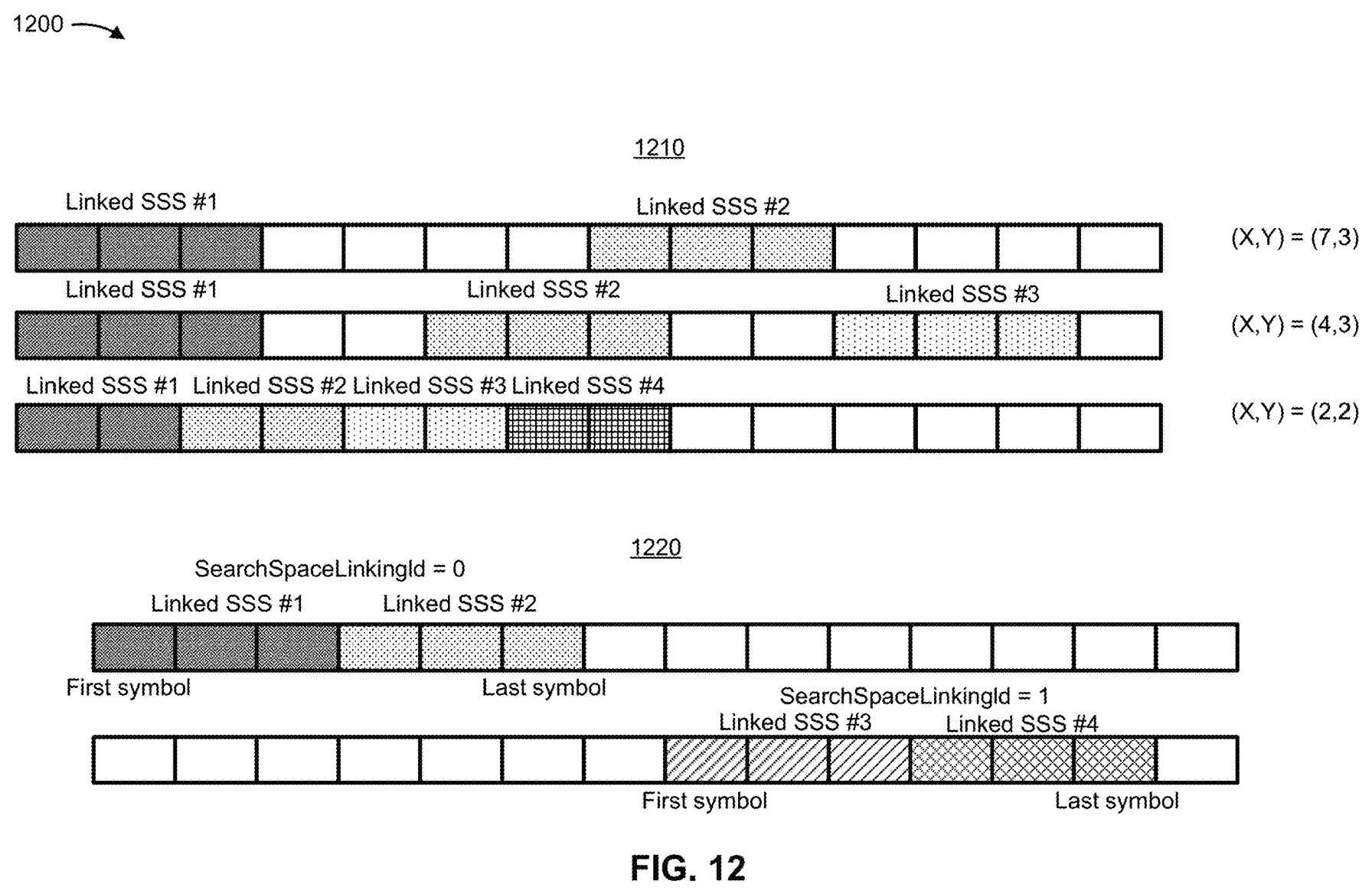

FIGS. 11 and 12 depict potential monitoring occasion configurations for PDCCH repetitions in the same slot. FIG. 11 relates to PDCCH repetitions in a slot that are in the same SSS (e.g., as discussed above with respect to FIG. 9), and FIG. 12 relates to PDCCH repetitions in a slot that are in different SSSs (e.g., as discussed above with respect to FIG. 10).

Turning first to FIG. 11, FIG. 11 is a diagram illustrating an example 1100 of monitoring occasion configurations for PDCCH repetitions in the same slot that are in the same SSS, in accordance with the present disclosure. Example 1100 includes a first set of slots 1110 and a second set of slots 1120.

The first set of slots 1110 includes three slots. The first slot includes a first PDCCH repetition at a first span located at symbols 0-2, and a second PDCCH repetition at a second span located at symbols 7-9. The second slot includes three PDCCH repetitions at three respective spans located at symbols 0-2, 5-7, and 10-12, respectively. The third slot includes seven PDCCH repetitions at seven respective spans located at symbols 0 and 1, 2 and 3, 4 and 5, 6 and 7, 8 and 9, 10 and 11, and 12 and 13, respectively.

The slots in the first set of slots 1110 may be configured according to a span-based configuration (X,Y) as described above in relation to FIG. 6. For example, "X" may represent a minimum gap between symbols of respective PDCCH repetitions (e.g., symbols of respective spans), and "Y" may represent a maximum symbol duration of the PDCCH repetitions (e.g., a maximum symbol duration of the spans). For example, the first slot may have a span-based PDCCH monitoring configuration of (7, 3). For example, the minimum gap between the starting symbols of the spans in the slot may be seven, and the maximum span duration of each span in the slot may be three. The second span and the third span may have span-based PDCCH monitoring configurations of (4, 3) and (2, 2), respectively. In some examples, the span-based PDCCH monitoring configurations may depend on UE capability.

The second set of slots 1120 relate to a non-(X,Y) configuration of span-based PDCCH monitoring configuration when PDCCH repetition is applied. The second set of slots 1120 may include a first slot, which may contain PDCCH repetitions in an SSS for a first UE, and a second slot, which may contain PDCCH repetitions in an SSS for a second UE. The PDCCH repetitions in the second set of slots 1120 may be arranged in any suitable configuration. For example, the first slot may include a first PDCCH repetition at symbols 0-2 and a second PDCCH repetition at symbols 3-5. For example, the second slot may include a first PDCCH repetition at symbols 7-9 and a second PDCCH repetition at symbols 10-12.

As indicated above, FIG. 11 is provided as an example. Other examples may differ from what is described with respect to FIG. 11.

FIG. 12 is a diagram illustrating an example 1200 of monitoring occasion configurations for PDCCH repetitions in the same slot that are in different linked SSSs, in accordance with the present disclosure. Example 1200 includes a first set of slots 1210 and a second set of slots 1220.

The first set of slots 1210 includes three slots. The first slot includes a first PDCCH repetition in linked SSS 1 and a second PDCCH repetition in linked SSS 2. The second slot includes three PDCCH repetitions in respective linked SSSs 1-3. The third slot includes four PDCCH repetitions in respective linked SSSs 1-4.

The slots in the first set of slots 1210 may be configured according to a linked SSS-based configuration (X,Y). For example, "X" may represent a minimum gap between symbols of respective PDCCH repetitions (e.g., symbols of respective linked SSSs), and "Y" may represent a maximum symbol duration of the PDCCH repetitions (e.g., a maximum symbol duration of the linked SSSs). The first slot, the second slot, and the third slot may have PDCCH monitoring configurations of (7, 3), (4, 3), and (2, 2), respectively.

The second set of slots 1220 relate to a non-(X,Y) configuration of linked SSS-based PDCCH monitoring configuration when PDCCH repetition is applied. The second set of slots 1220 may include a first slot, which may contain PDCCH repetitions in different SSSs that are linked via SearchSpaceLinkingId=0, and a second slot, which may contain PDCCH repetitions in different SSSs that are linked via SearchSpaceLinkingId=1. The PDCCH repetitions in the second set of slots 1220 may be arranged in any suitable configuration. For example, the first slot may include a first PDCCH repetition at symbols 0-2 and a second PDCCH repetition at symbols 3-5. For example, the second slot may include a first PDCCH repetition at symbols 7-9 and a second PDCCH repetition at symbols 10-12.

As indicated above, FIG. 12 is provided as an example. Other examples may differ from what is described with respect to FIG. 12.

FIG. 13 is a diagram illustrating an example 1300 associated with limits on the quantity of non-overlapping CCEs and/or limits on the quantity of blind decodes (BDs), in accordance with the present disclosure.

To receive a PDCCH associated with one or more candidates, a UE may attempt to decode a PDCCH in candidates of the associated SSS. For example, the UE may determine one or more CCE indices associated with a candidate, and may attempt to decode the PDCCH (e.g., using a blind decoding procedure). Limits on the number of non-overlapping CCEs and blind decodes (BDs) may be defined on a per-slot basis, a per-span basis, or a per-linked-SSS basis.

When limits on the number of non-overlapping CCEs and BDs are defined on a per-slot basis, slot configuration may be associated with a per-slot capability for a quantity of BDs and/or a quantity of non-overlapped CCEs in a slot. A per-slot capability for a quantity of BDs may identify a maximum number of BDs that can be configured in a slot, and a per-slot capability for a number of non-overlapped CCEs may identify a maximum number of non-overlapped CCEs that can be configured in a slot.

When limits on the number of non-overlapping CCEs and BDs are defined on a per-span basis, span configuration may be associated with a per-span capability for a quantity of BDs and/or a quantity of non-overlapped CCEs in a span. A per-span capability for a quantity of BDs may identify a maximum number of BDs that can be configured in a span, and a per-span capability for a number of non-overlapped CCEs may identify a maximum number of non-overlapped CCEs that can be configured in a span.

When limits on the number of non-overlapping CCEs and BDs are defined on a per-linked-SSS basis, a linked SSS configuration may be associated with a per-linked-SSS capability for a quantity of BDs and/or a quantity of non-overlapped CCEs in a linked SSS in the slot. A per-linked-SSS capability for a quantity of BDs may identify a maximum number of BDs that can be configured in a linked SSS in the slot, and a per-linked-SSS capability for a number of non-overlapped CCEs may identify a maximum number of non-overlapped CCEs that can be configured in a linked SSS in the slot.

Example 1300 includes table 1310 and table 1320. Table 1310 indicates example maximum quantities of non-overlapping CCEs associated with a PDCCH repetition, and example maximum quantities of BDs associated with the PDCCH repetition. The maximum quantities of non-overlapping CCEs and the maximum quantities of the BDs may be limited on a per-slot basis, and may depend on subcarrier spacing (SCS).

Table 1320 indicates example maximum quantities of non-overlapping CCEs associated with a PDCCH repetition, and example maximum quantities of blind decodes associated with the PDCCH repetition. The maximum quantities of non-overlapping CCEs and the maximum quantities of the BDs may be limited on a per-span or per-linked-SSS basis, and may depend on SCS.

In some examples, a UE that is configured to perform one PDCCH decoding operation on the slot (e.g., after performing an LLR-based combining operation on the PDCCH repetitions) may apply a per-slot BD limit (e.g., in accordance with table 1310). In some examples, a UE that is configured to perform independent PDCCH decoding operations for every span or linked SSS in the slot may apply a per-span or per-linked-SSS BD limit (e.g., in accordance with table 1320).

As indicated above, FIG. 13 is provided as an example. Other examples may differ from what is described with respect to FIG. 13.

Figure 14:
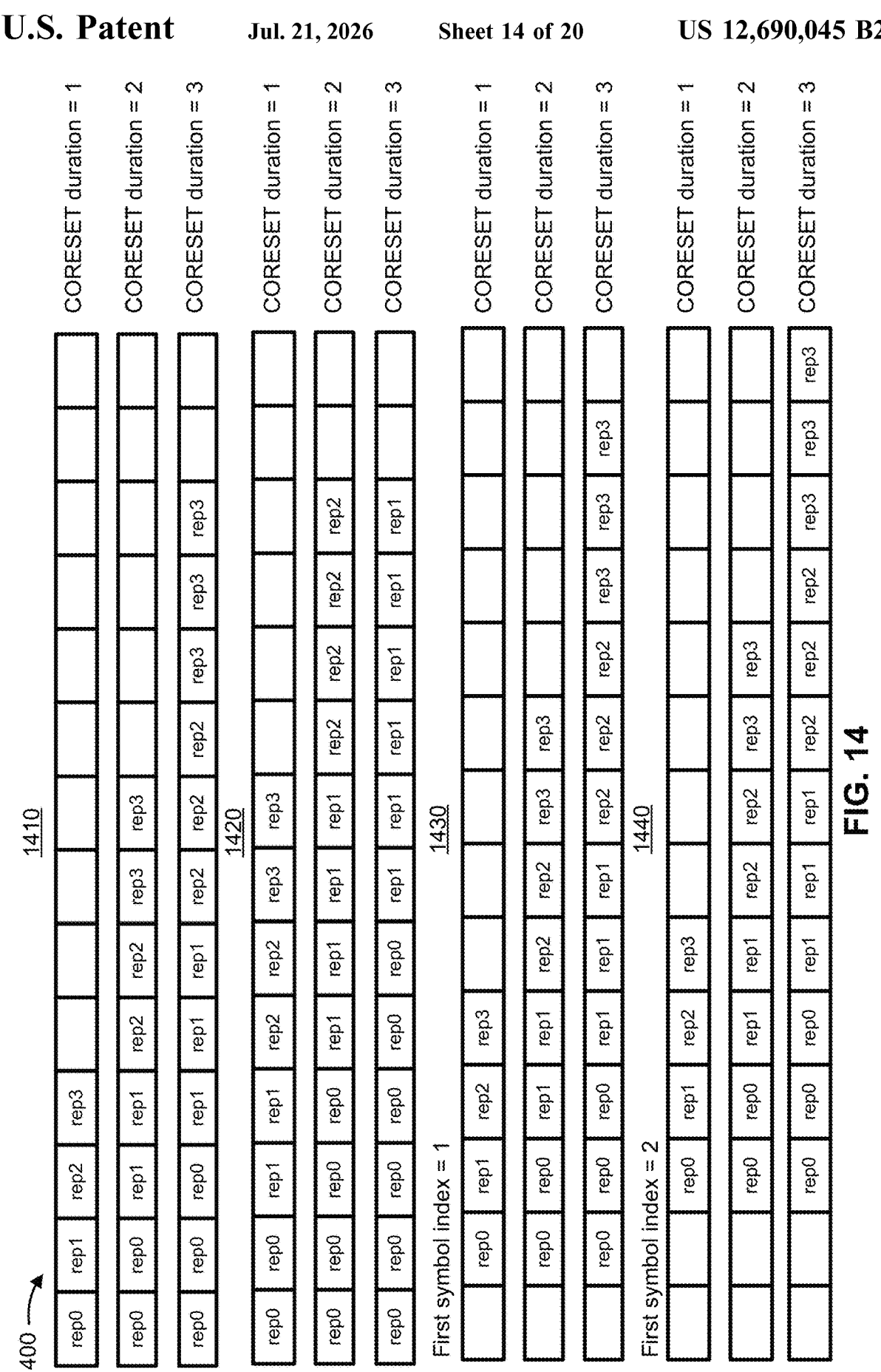
FIG. 14 is a diagram illustrating an example of slot configurations for PDCCH repetitions in the same slot in the same SSS, in accordance with the present disclosure.
Figure 15:
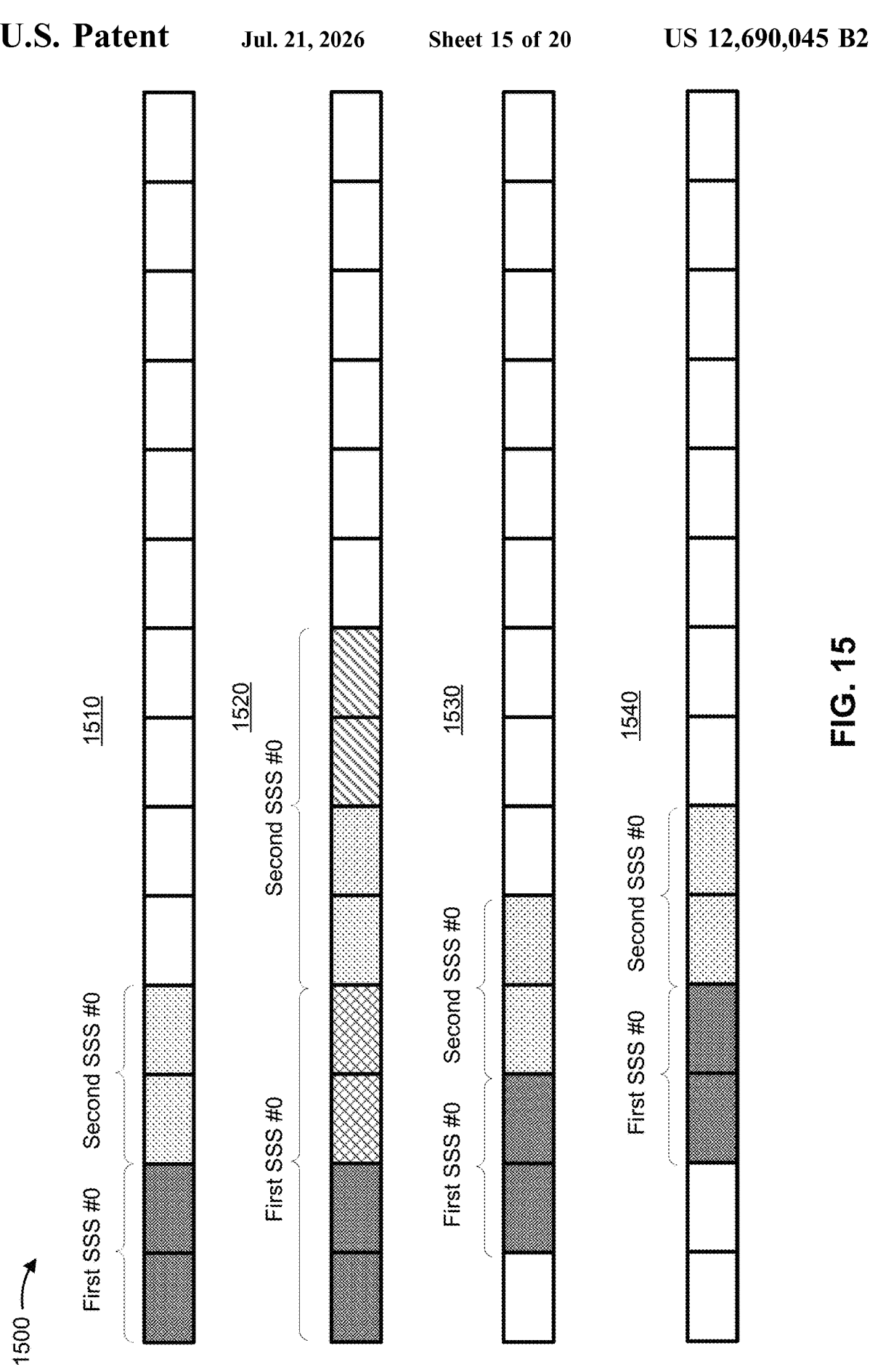
FIG. 15 is a diagram illustrating an example of slot configurations for PDCCH repetitions in the same slot in different SSSs, in accordance with the present disclosure.

FIGS. 14 and 15 depict slot configurations for PDCCH repetitions in the same slot. For example, as described in greater detail below, the slot may be configured based on one or more of: a quantity of SSSs for the slot; a variable ("M") related to the length of SSSs for the slot; or a symbol index for the slot. The symbol index may be a symbol index of a PDCCH repetition (e.g., an initial PDCCH repetition in the slot). FIG. 14 relates to PDCCH repetitions in a slot that are in the same SSS (e.g., as discussed above with respect to FIG. 9), and FIG. 15 relates to PDCCH repetitions in a slot that are in different SSSs (e.g., as discussed above with respect to FIG. 10).

Turning first to FIG. 14, FIG. 14 is a diagram illustrating an example 1400 of slot configurations for PDCCH repetitions ("rep0," "rep1," "rep2," and "rep3") in the same slot in the same SSS, in accordance with the present disclosure. Example 1400 includes four sets of slots 1410-1440. Each set of slots 1410-1440 may have a respective configuration.

In each set of slots 1410-1440, the first, second, and third slots may have CORESET (e.g., symbol) durations of one, two, and three, respectively. The first set of slots 1410 may have one SSS per slot, M equal to one or two, and a symbol index (e.g., a first symbol index) of zero. The second set of slots 1420 may have two SSSs per slot, M equal to ½, and a symbol index of $$\{0, N_{symb}^{CORESET}\}.$$

In the first slot of the second set of slots 1420, the first instance of rep_i (e.g., rep0, rep1, rep2, or rep3) may be in the first SSS, and the second instance of rep_i may be in the second SSS. In the second slot of the second set of slots 1420, the first two instances of rep_i may be in the first SSS, and the second two instances of rep_i may be in the second SSS. In the third slot of the second set of slots 1420, the first three instances of rep_i may be in the first SSS, and the second three instances of rep_i may be in the second SSS. The third set of slots 1430 may have one SSS per slot, M equal to one, and a symbol index of one. The fourth set of slots 1440 may have one SSS per slot, M equal to one, and a symbol index of two.

In some examples, the SSS where the PDCCH repetitions are located may be SSS 0. For instance, an SSS 0 table for FR1 multiplexing pattern 1 for an NTN band may be specified. A UE may monitor PDCCHs on SSS 0 based on an SSS 0 table (e.g., for rep0) and/or an SSS 0 table for FR1 multiplexing pattern 1 for an NTN band (e.g., for all PDCCH repetitions, including rep0, rep1, rep2, and/or rep3). In some examples, the location of rep0 within the slot may be a location where a legacy UE (e.g., a UE that is not configured to monitor for multiple PDCCH repetitions in the same slot) may monitor for rep0, which may enable backward compatibility with legacy UEs.

As indicated above, FIG. 14 is provided as an example. Other examples may differ from what is described with respect to FIG. 14.

FIG. 15 is a diagram illustrating an example 1500 of slot configurations for PDCCH repetitions in the same slot in different SSSs, in accordance with the present disclosure. Example 1500 includes four slots 1510-1540. Each of slots 1510-1540 may have a respective configuration.

The first slot 1510 may have one SSS per slot, M equal to one or two, and a symbol index (e.g., a first symbol index) of zero. The second slot 1520 may have two SSSs per slot, M equal to ½, and a symbol index of $$\{0, N_{symb}^{CORESET}\}.$$

The third slot 1530 may have one SSS per slot, M equal to one, and a symbol index of one. The fourth slot 1540 may have one SSS per slot, M equal to one, and a symbol index of two.

In some examples, the SSSs where the PDCCH repetitions are located may be a first SSS 0 and a second SSS 0. The first SSS 0 and the second SSS 0 may have the same SSS configuration other than the starting symbol index. A UE may monitor PDCCHs on the first SSS 0 and/or the second SSS 0. In some examples, legacy UEs may monitor PDCCHs on the first SSS 0. Thus, some techniques described herein may be backward-compatible.

As indicated above, FIG. 15 is provided as an example. Other examples may differ from what is described with respect to FIG. 15.

Figure 16:
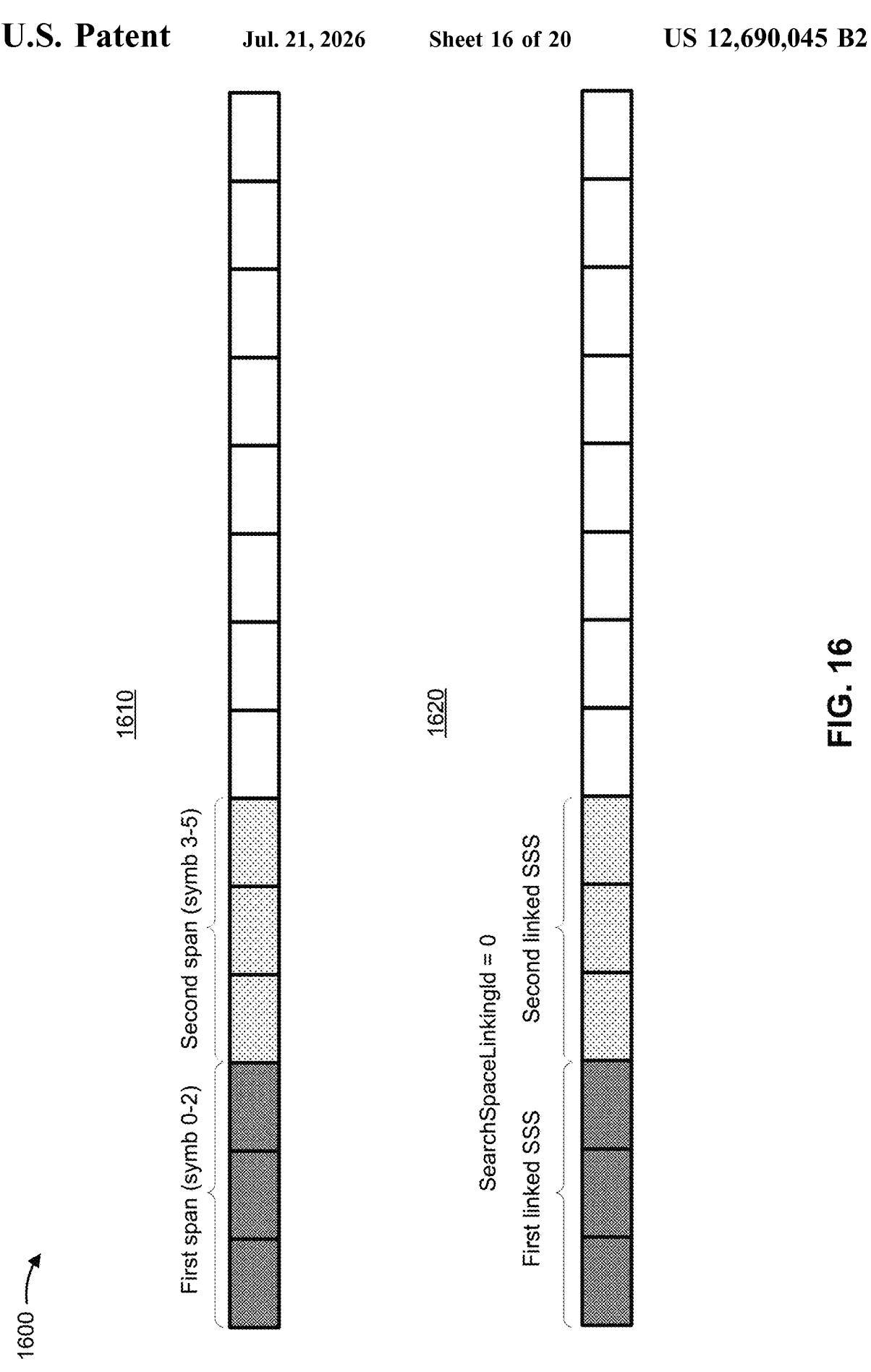
FIG. 16 is a diagram illustrating an example of slots that include PDCCH repetitions in one or more common search spaces or one or more UE-specific search spaces, in accordance with the present disclosure.

FIG. 16 is a diagram illustrating an example 1600 of slots that include PDCCH repetitions in CSS(s) or USS(s), in accordance with the present disclosure. FIG. 16 depicts a slot 1610 and a slot 1620. The PDCCH repetitions in slot 1610 are in the same SSS, and the PDCCH repetitions in slot 1620 are in different SSSs. For example, slot 1610 may include a first PDCCH repetition in a first span (symbols 0-2) and a second PDCCH repetition in a second span (symbols 3-5). For example, slot 1620 may include a first PDCCH repetition in the first linked SSS and a second PDCCH repetition in the second linked SSS. The first linked SSS and the second linked SSS may be linked by SearchSpaceLinkingId=0). Slot 1610 and slot 1620 may each have a CORESET duration of three.

In some examples, the PDCCH repetitions may be in SSS(s) such as CSS(s) or USS(s). A CSS may include type 0A CSS, type 1 CSS, type 2 CSS, or the like, and may be used for signaling relating to other system information (OSI), random access channel (RACH), paging, or the like. If the PDCCH repetitions are in a CSS, then a network entity may output, and a UE may receive, one or more parameters in system information (e.g., a SIB1) that indicate locations of respective PDCCH repetitions in slot 1610 or slot 1620. As explained below, the parameter(s) may be monitoringSymbolWithinSlotRepetition for slot 1610 and monitoringSymbolWithinSlot for slot 1620.

In cases where the PDCCH repetitions in slot 1610 are in a CSS, a SIB1 may contain an IE (e.g., PDCCH-Config-Common) that configures the PDCCH repetitions. In some examples, the IE may contain a parameter (e.g., monitoringSymbolWithinSlot). The IE may also contain a separate parameter (e.g., monitoringSymbolWithinSlotRepetition) that a non-legacy UE may use to monitor for PDCCH repetitions within slot 1610. Because monitoringSymbolWithinSlotRepetition may indicate locations for multiple PDCCH repetitions and monitoringSymbolWithinSlot may indicate only the location of a single PDCCH repetition, monitoringSymbolWithinSlotRepetition may include a superset of information provided by monitoringSymbolWithinSlot. For example, monitoringSymbolWithinSlotRepetition may include the value "100100000000000" (where the instances of "1" indicate the locations of both PDCCH repetitions in slot 1610) and monitoringSymbolWithinSlot may include the value "100000000000000" (where the only instance of "1" indicates the location of the first PDCCH repetition). Based on monitoringSymbolWithinSlotRepetition the non-legacy UE may combine an LLR for the first span and an LLR for the second span, and thereby determine the PDCCH with a higher likelihood of success than the legacy UE.

In cases where the PDCCH repetitions in slot 1620 are in a CSS, a SIB1 may configure the PDCCH repetitions with multiple linked SSSs. In some examples, the linked SSSs may be identical except for the parameter monitoringSymbolWithinSlot. For example, monitoringSymbolWithinSlot for SSS 1 may include the value "1000000000000" (where the "1" indicates the location of the first PDCCH repetition in slot 1620) and monitoringSymbolWithinSlot for SSS 2 may include the value "0001000000000" (where the "1" indicates the location of the second PDCCH repetition in slot 1620). Based on monitoringSymbolWithinSlot, a UE may combine LLRs corresponding to the respective SSSs and thereby determine the PDCCH.

In cases where the PDCCH repetitions in slot 1610 or slot 1620 are in a USS, the network entity may output, and the UE may receive, RRC signaling that indicates the locations of the respective PDCCH repetitions in slot 1610 or slot 1620. Thus, the network entity may configure the PDCCH repetitions via dedicated RRC signaling.

As indicated above, FIG. 16 is provided as an example. Other examples may differ from what is described with respect to FIG. 16.

In some aspects, an SSS in which PDCCH repetitions are located may be configured. For example, the network entity may signal a configuration for SSS 0 (e.g., an SSS 0 table). For example, in the case of linked SSSs, the network entity may configure a companion SSS 0 configuration.

In some examples, the SSS may be configured for a plurality of cells. For instance, the network entity may configure, via SIB1, a deployment-specific companion SSS 0 configuration (e.g., an SSS 0 table configuration) that is applicable to all NR NTN cells in a given deployment. In some examples, the SSS may be configured for a plurality of network entities configured to operate in a configured carrier frequency. For instance, the network entity may configure, via SIB1, an SSS 0 configuration (e.g., an SSS 0 table configuration, a frequency-specific companion SSS 0 configuration, or the like) that is applicable to all NR NTN network entities (e.g., cells, gNBs, or the like) in a given carrier frequency. In some examples, the SSS may be configured for a serving cell for the UE. For example, the network entity may configure an SSS 0 configuration (e.g., an SSS 0 table configuration, a cell-specific companion SSS 0, or the like) that is applicable to the serving cell (e.g., applicable to only the serving cell).

Figure 17:
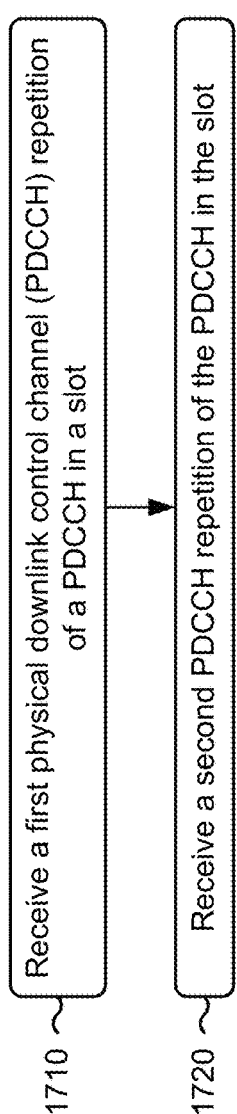
FIG. 17 shows a method for wireless communications by a UE, in accordance with the present disclosure.

FIG. 17 shows a method 1700 for wireless communications by a UE, such as UE 120.

Method 1700 begins at 1710 with receiving a first PDCCH repetition of a PDCCH in a slot.

Method 1700 then proceeds to step 1720 with receiving a second PDCCH repetition of the PDCCH in the slot.

In a first aspect, method 1700 includes receiving the first PDCCH repetition comprises receiving the first PDCCH repetition from a network entity, and receiving the second PDCCH repetition comprises receiving the second PDCCH repetition from the network entity.

In a second aspect, the first PDCCH repetition is located in a search space set and the second PDCCH repetition is located in the search space set.

In a third aspect, method 1700 includes receiving an indication of a parameter that identifies a quantity of PDCCH repetitions in the slot, wherein the PDCCH repetitions include the first PDCCH repetition and the second PDCCH repetition.

In a fourth aspect, an initial symbol of an initial span in the slot is a first reference symbol for PDCCH reception and a final symbol of a final span in the slot is a second reference symbol for the PDCCH reception.

In a fifth aspect, the first PDCCH repetition is in a first search space set, the second PDCCH repetition is in a second search space set, and the first search space set and the second search space set are linked.

In a sixth aspect, method 1700 includes receiving an indication of one or more parameters that indicate a first location of the first PDCCH repetition in the slot and a second location of the second PDCCH repetition in the slot.

In a seventh aspect, the slot is configured based on a minimum gap between a symbol of the first PDCCH repetition and a symbol of the second PDCCH repetition and further based on a maximum symbol duration of the first PDCCH repetition and the second PDCCH repetition.

In an eighth aspect, one or more of a quantity of non-overlapping control channel elements associated with the first PDCCH repetition and the second PDCCH repetition or a quantity of blind decodes associated with the first PDCCH repetition and the second PDCCH repetition are limited on a per-slot basis.

In a ninth aspect, one or more of a quantity of non-overlapping control channel elements associated with the first PDCCH repetition and the second PDCCH repetition or a quantity of blind decodes associated with the first PDCCH repetition and the second PDCCH repetition are limited on a per-span or a per-linked-search-space-set basis.

In a tenth aspect, the slot is configured based on one or more of a quantity of search space sets for the slot, a variable related to a length of search space sets for the slot, or a symbol index of an initial symbol of the first PDCCH repetition or the second PDCCH repetition for the slot.

In an eleventh aspect, a search space set in which the first PDCCH repetition and the second PDCCH repetition are located is configured for one or more of a plurality of cells, a plurality of network entities configured to operate in a configured carrier frequency, or a serving cell for the UE.

In a twelfth aspect, the first PDCCH repetition and the second PDCCH repetition are in a common search space.

In a thirteenth aspect, method 1700 includes receiving, in system information, an indication of one or more parameters that indicate a first location of the first PDCCH repetition in the slot and a second location of the second PDCCH repetition in the slot.

In a fourteenth aspect, the first PDCCH repetition and the second PDCCH repetition are in a UE-specific search space, the method further comprising receiving radio resource control signaling that indicates a first location of the first PDCCH repetition in the slot and a second location of the second PDCCH repetition in the slot.

In one aspect, method 1700, or any aspect related to it, may be performed by an apparatus, such as communications device 1900 of FIG. 19, which includes various components operable, configured, or adapted to perform the method 1700. Communications device 1900 is described below in further detail.

Note that FIG. 17 is just one example of a method, and other methods including fewer, additional, or alternative steps are possible consistent with this disclosure.

Figure 18:
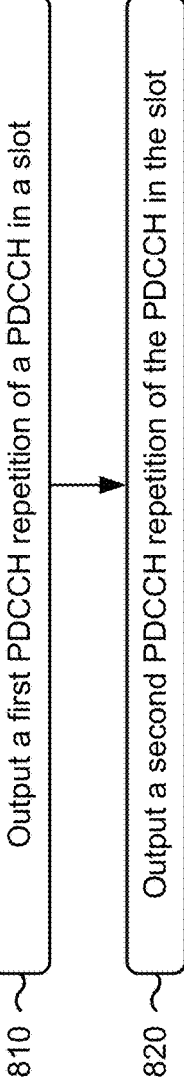
FIG. 18 shows a method for wireless communications by a network entity, in accordance with the present disclosure.

FIG. 18 shows a method 1800 for wireless communications by a network entity, such as BS 110, or a disaggregated base station as discussed with respect to FIG. 3.

Method 1800 begins at 1810 with outputting a first PDCCH repetition of a PDCCH in a slot.

Method 1800 then proceeds to step 1820 with outputting a second PDCCH repetition of the PDCCH in the slot.

In a first aspect, the first PDCCH repetition is located in a search space set and the second PDCCH repetition is located in the search space set.

In a second aspect, method 1800 includes outputting an indication of a parameter that identifies a quantity of PDCCH repetitions in the slot, wherein the PDCCH repetitions include the first PDCCH repetition and the second PDCCH repetition.

In a third aspect, an initial symbol of an initial span in the slot is a first reference symbol for PDCCH reception and a final symbol of a final span in the slot is a second reference symbol for the PDCCH reception.

In a fourth aspect, the first PDCCH repetition is in a first search space set, the second PDCCH repetition is in a second search space set, and the first search space set and the second search space set are linked.

In a fifth aspect, method 1800 includes outputting, in system information, an indication of one or more parameters that indicate a first location of the first PDCCH repetition in the slot and a second location of the second PDCCH repetition in the slot.

In a sixth aspect, the slot is configured based on a minimum gap between a symbol of the first PDCCH repetition and a symbol of the second PDCCH repetition and further based on a maximum symbol duration of the first PDCCH repetition and the second PDCCH repetition.

In a seventh aspect, one or more of a quantity of non-overlapping control channel elements associated with the first PDCCH repetition and the second PDCCH repetition or a quantity of blind decodes associated with the first PDCCH repetition and the second PDCCH repetition are limited on a per-slot basis.

In an eighth aspect, one or more of a quantity of non-overlapping control channel elements associated with the first PDCCH repetition and the second PDCCH repetition or a quantity of blind decodes associated with the first PDCCH repetition and the second PDCCH repetition are limited on a per-span or a per-linked-search-space-set basis.

In a ninth aspect, the slot is configured based on one or more of a quantity of search space sets for the slot, a variable related to a length of search space sets for the slot, or a symbol index of an initial symbol of the first PDCCH repetition or the second PDCCH repetition for the slot.

In a tenth aspect, a search space set in which the first PDCCH repetition and the second PDCCH repetition are located is configured for one or more of a plurality of cells, a plurality of network entities configured to operate in a configured carrier frequency, or a serving cell for a UE.

In an eleventh aspect, the first PDCCH repetition and the second PDCCH repetition are in a common search space.

In a twelfth aspect, method 1800 includes outputting, in system information, an indication of one or more parameters that indicate a first location of the first PDCCH repetition in the slot and a second location of the second PDCCH repetition in the slot.

In a thirteenth aspect, the first PDCCH repetition and the second PDCCH repetition are in a UE-specific search space, the method 1800 further comprising outputting radio resource control signaling that indicates a first location of the first PDCCH repetition in the slot and a second location of the second PDCCH repetition in the slot.

Figure 20:
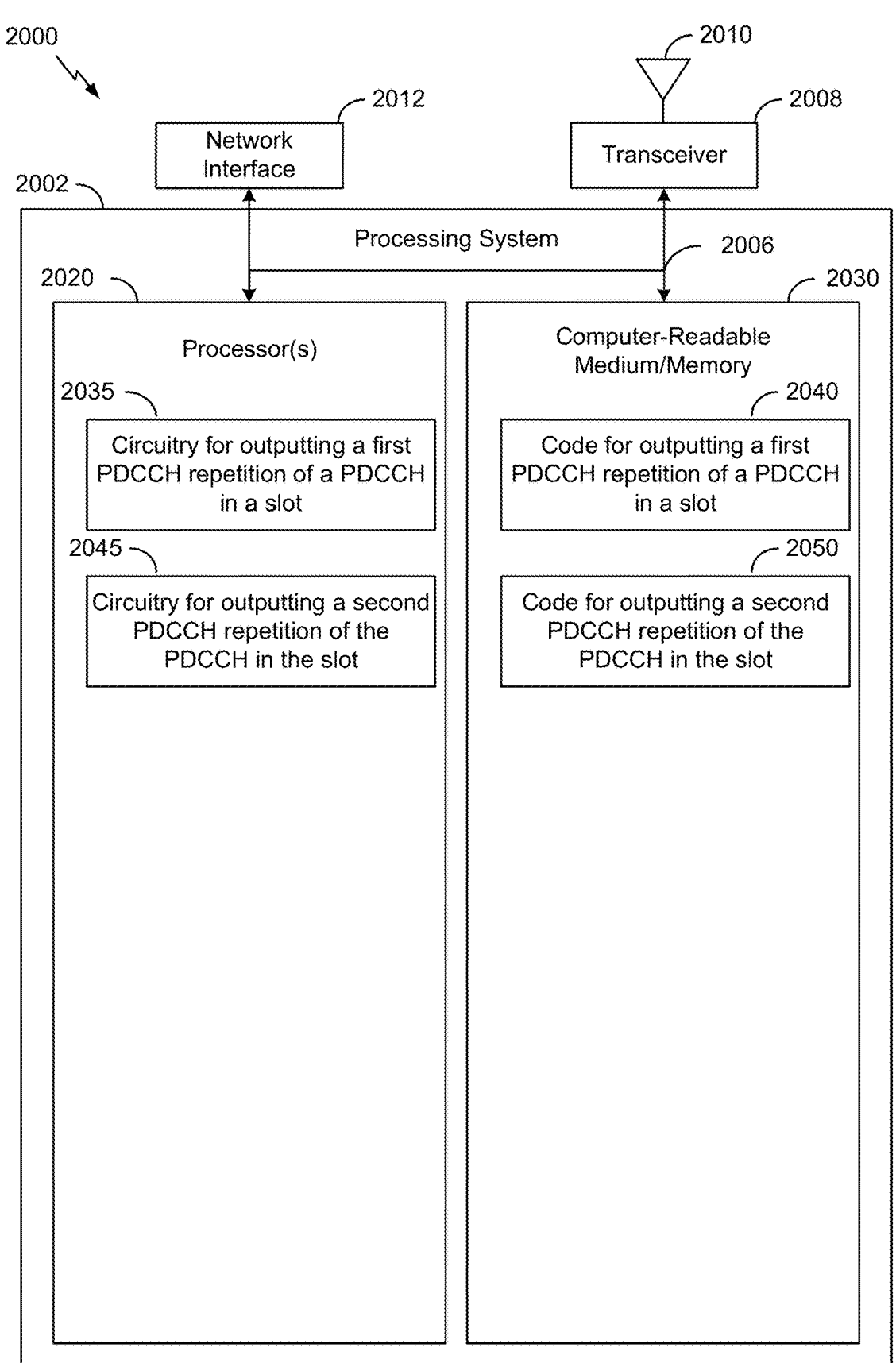
FIG. 20 is a diagram illustrating an example of an implementation of code and circuitry for a communications device, in accordance with the present disclosure.

In one aspect, method 1800, or any aspect related to it, may be performed by an apparatus, such as communications device 2000 of FIG. 20, which includes various components operable, configured, or adapted to perform the method 1800. Communications device 2000 is described below in further detail.

Note that FIG. 18 is just one example of a method, and other methods including fewer, additional, or alternative steps are possible consistent with this disclosure.

FIG. 19 is a diagram illustrating an example of an implementation of code and circuitry for a communications device 1900, in accordance with the present disclosure. The communications device 1900 may be a UE, or a UE may include the communications device 1900.

The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes one or more processors 1920. In various aspects, the one or more processors 1920 may be representative of one or more of receive processor 258, transmit processor 264, TX MIMO processor 266, and/or controller/processor 280, as described with respect to FIG. 2. The one or more processors 1920 are coupled to a computer-readable medium/memory 1930 via a bus 1906. In various aspects, the computer-readable medium/memory 1930 may be representative of memory 282, as described with respect to FIG. 2. In certain aspects, the computer-readable medium/memory 1930 is configured to store instructions (e.g., computer-executable code, processor-executable code) that when executed by the one or more processors 1920, cause the one or more processors 1920 to perform the method 1700 described with respect to FIG. 17, or any aspect related to it. Note that reference to a processor performing a function of communications device 1900 may include one or more processors performing that function of communications device 1900.

As shown in FIG. 19, the communications device 1900 may include circuitry for receiving a first PDCCH repetition of a PDCCH in a slot (circuitry 1935).

As shown in FIG. 19, the communications device 1900 may include, stored in computer-readable medium/memory 1930, code for receiving a first PDCCH repetition of a PDCCH in a slot (code 1940).

As shown in FIG. 19, the communications device 1900 may include circuitry for receiving a second PDCCH repetition of the PDCCH in the slot (circuitry 1945).

As shown in FIG. 19, the communications device 1900 may include, stored in computer-readable medium/memory 1930, code for receiving a second PDCCH repetition of the PDCCH in the slot (code 1950).

Various components of the communications device 1900 may provide means for performing the method 1700 described with respect to FIG. 17, or any aspect related to it. For example, means for transmitting, sending, or outputting for transmission may include the transceiver(s) 254 and/or antenna(s) 252 of the UE 120 and/or transceiver 1908 and antenna 1910 of the communications device 1900 in FIG. 19. Means for receiving or obtaining may include the transceiver(s) 254 and/or antenna(s) 252 of the UE 120 and/or transceiver 1908 and antenna 1910 of the communications device 1900 in FIG. 19.

FIG. 19 is provided as an example. Other examples may differ from what is described in connection with FIG. 19.

FIG. 20 is a diagram illustrating an example of an implementation of code and circuitry for a communications device 2000, in accordance with the present disclosure. The communications device 2000 may be a network entity (such as BS 110 or a disaggregated base station as described with regard to FIG. 3), or a network entity may include the communications device 2000.

The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The network interface 2012 is configured to obtain and send signals for the communications device 2000 via communications link(s), such as a backhaul link, midhaul link, and/or fronthaul link as described herein, such as with respect to FIG. 3. The processing system 2002 may be configured to perform processing functions for the communications device 2000, including processing signals received and/or to be transmitted by the communications device 2000.

The processing system 2002 includes one or more processors 2020. In various aspects, the one or more processors 2020 may be representative of one or more of receive processor 238, transmit processor 220, TX MIMO processor 230, and/or controller/processor 240, as described with respect to FIG. 2. The one or more processors 2020 are coupled to a computer-readable medium/memory 2030 via a bus 2006. In various aspects, the computer-readable medium/memory 2030 may be representative of memory 242, as described with respect to FIG. 2. In certain aspects, the computer-readable medium/memory 2030 is configured to store instructions (e.g., computer-executable code, processor-executable code) that when executed by the one or more processors 2020, cause the one or more processors 2020 to perform the method 1800 described with respect to FIG. 18, or any aspect related to it. Note that reference to a processor performing a function of communications device 2000 may include one or more processors performing that function of communications device 2000.

As shown in FIG. 20, the communications device 2000 may include circuitry for outputting a first PDCCH repetition of a PDCCH in a slot (circuitry 2035).

As shown in FIG. 20, the communications device 2000 may include, stored in computer-readable medium/memory 2030, code for outputting a first PDCCH repetition of a PDCCH in a slot (code 2040).

As shown in FIG. 20, the communications device 2000 may include circuitry for outputting a second PDCCH repetition of the PDCCH in the slot (circuitry 2045).

As shown in FIG. 20, the communications device 2000 may include, stored in computer-readable medium/memory 2030, code for outputting a second PDCCH repetition of the PDCCH in the slot (code 2050).

Various components of the communications device 2000 may provide means for performing the method 1800 described with respect to FIG. 18, or any aspect related to it. For example, means for transmitting, sending, or outputting for transmission may include the transceiver(s) 232 and/or antenna(s) 234 of the BS 110 and/or transceiver 2008 and antenna 2010 of the communications device 2000 in FIG. 20. Means for receiving or obtaining may include the transceiver(s) 232 and/or antenna(s) 234 of the BS 110 and/or transceiver 2008 and antenna 2010 of the communications device 2000 in FIG. 20.

FIG. 20 is provided as an example. Other examples may differ from what is described in connection with FIG. 20.

The following provides an overview of some Aspects of the present disclosure:

Aspect 1: A method of wireless communication performed by a user equipment (UE), comprising: receiving a first physical downlink control channel (PDCCH) repetition of a PDCCH in a slot; and receiving a second PDCCH repetition of the PDCCH in the slot.

Aspect 2: The method of Aspect 1, wherein: receiving the first PDCCH repetition comprises receiving the first PDCCH repetition from a network entity; and receiving the second PDCCH repetition comprises receiving the second PDCCH repetition from the network entity.

Aspect 3: The method of any of Aspects 1-2, wherein the first PDCCH repetition is located in a search space set and the second PDCCH repetition is located in the search space set.

Aspect 4: The method of Aspect 3, further comprising: receiving an indication of a parameter that identifies a quantity of PDCCH repetitions in the slot, wherein the PDCCH repetitions include the first PDCCH repetition and the second PDCCH repetition.

Aspect 5: The method of Aspect 3, wherein an initial symbol of an initial span in the slot is a first reference symbol for PDCCH reception and a final symbol of a final span in the slot is a second reference symbol for the PDCCH reception.

Aspect 6: The method of any of Aspects 1 or 2, wherein the first PDCCH repetition is in a first search space set, the second PDCCH repetition is in a second search space set, and the first search space set and the second search space set are linked.

Aspect 7: The method of Aspect 6, further comprising: receiving an indication of one or more parameters that indicate a first location of the first PDCCH repetition in the slot and a second location of the second PDCCH repetition in the slot.

Aspect 8: The method of any of Aspects 1-7, wherein the slot is configured based on a minimum gap between a symbol of the first PDCCH repetition and a symbol of the second PDCCH repetition and further based on a maximum symbol duration of the first PDCCH repetition and the second PDCCH repetition.

Aspect 9: The method of any of Aspects 1-8, wherein one or more of a quantity of non-overlapping control channel elements associated with the first PDCCH repetition and the second PDCCH repetition or a quantity of blind decodes associated with the first PDCCH repetition and the second PDCCH repetition are limited on a per-slot basis.

Aspect 10: The method of any of Aspects 1-9, wherein one or more of a quantity of non-overlapping control channel elements associated with the first PDCCH repetition and the second PDCCH repetition or a quantity of blind decodes associated with the first PDCCH repetition and the second PDCCH repetition are limited on a per-span or a per-linked-search-space-set basis.

Aspect 11: The method of any of Aspects 1-10, wherein the slot is configured based on one or more of: a quantity of search space sets for the slot; a variable related to a length of search space sets for the slot; or a symbol index of an initial symbol of the first PDCCH repetition or the second PDCCH repetition for the slot.

Aspect 12: The method of any of Aspects 1-11, wherein a search space set in which the first PDCCH repetition and the second PDCCH repetition are located is configured for one or more of: a plurality of cells; a plurality of network entities configured to operate in a configured carrier frequency; or a serving cell for the UE.

Aspect 13: The method of any of Aspects 1-12, wherein the first PDCCH repetition and the second PDCCH repetition are in a common search space.

Aspect 14: The method of Aspect 13, further comprising: receiving, in system information, an indication of one or more parameters that indicate a first location of the first PDCCH repetition in the slot and a second location of the second PDCCH repetition in the slot.

Aspect 15: The method of any of Aspects 1-14, wherein the first PDCCH repetition and the second PDCCH repetition are in a UE-specific search space, the method further comprising: receiving radio resource control signaling that indicates a first location of the first PDCCH repetition in the slot and a second location of the second PDCCH repetition in the slot.

Aspect 16: A method of wireless communication performed by a network entity, comprising: outputting a first physical downlink control channel (PDCCH) repetition of a PDCCH in a slot; and outputting a second PDCCH repetition of the PDCCH in the slot.

Aspect 17: The method of Aspect 16, wherein the first PDCCH repetition is located in a search space set and the second PDCCH repetition is located in the search space set.

Aspect 18: The method of Aspect 17, further comprising: outputting an indication of a parameter that identifies a quantity of PDCCH repetitions in the slot, wherein the PDCCH repetitions include the first PDCCH repetition and the second PDCCH repetition.

Aspect 19: The method of Aspect 17, wherein an initial symbol of an initial span in the slot is a first reference symbol for PDCCH reception and a final symbol of a final span in the slot is a second reference symbol for the PDCCH reception.

Aspect 20: The method of Aspect 16, wherein the first PDCCH repetition is in a first search space set, the second PDCCH repetition is in a second search space set, and the first search space set and the second search space set are linked.

Aspect 21: The method of Aspect 20, further comprising: outputting, in system information, an indication of one or more parameters that indicate a first location of the first PDCCH repetition in the slot and a second location of the second PDCCH repetition in the slot.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
one or more memories; and
one or more processors, coupled to the one or more memories, configured to cause the UE to:
receive a first physical downlink control channel (PDCCH) repetition of a PDCCH in a slot, the first PDCCH repetition being located in a first common search space (CSS); and
receive a second PDCCH repetition of the PDCCH in the slot, the second PDCCH repetition being located in a second CSS that is of a same CSS type as the first CSS, wherein the first CSS and the second CSS are linked via a search space linking identifier configured by radio resource control (RRC) signaling.

2. The UE of claim 1, wherein:
the one or more processors, to receive the first PDCCH repetition, are configured to receive the first PDCCH repetition from a network entity; and the one or more processors, to receive the second PDCCH repetition, are configured to receive the second PDCCH repetition from the network entity.

3. The UE of claim 1, wherein the first PDCCH repetition is located in a first search space set and the second PDCCH repetition is located in a second search space set.

4. The UE of claim 1, wherein the one or more processors are further configured to cause the UE to:
receive an indication of a parameter that identifies a quantity of PDCCH repetitions in the slot, wherein the PDCCH repetitions include the first PDCCH repetition and the second PDCCH repetition.

5. The UE of claim 1, wherein an initial symbol of an initial span in the slot is a first reference symbol for PDCCH reception and a final symbol of a final span in the slot is a second reference symbol for the PDCCH reception.

6. The UE of claim 1, wherein the one or more processors are further configured to cause the UE to:
receive an indication of one or more parameters that indicate a first location of the first PDCCH repetition in the slot and a second location of the second PDCCH repetition in the slot.

7. The UE of claim 1, wherein the slot is configured based on a minimum gap between a symbol of the first PDCCH repetition and a symbol of the second PDCCH repetition and further based on a maximum symbol duration of the first PDCCH repetition and the second PDCCH repetition.

8. The UE of claim 1, wherein a quantity of non-overlapping control channel elements associated with the first PDCCH repetition and the second PDCCH repetition is limited on a per-slot basis.

9. The UE of claim 1, wherein the slot is configured based on one or more of:
a quantity of search space sets for the slot;
a variable related to a length of search space sets for the slot; or
a symbol index of an initial symbol of the first PDCCH repetition or the second PDCCH repetition for the slot.

10. The UE of claim 1, wherein a search space set in which the first PDCCH repetition and the second PDCCH repetition are located is configured for one or more of:
a plurality of cells;
a plurality of network entities configured to operate in a configured carrier frequency; or a serving cell for the UE.

11. The UE of claim 1, wherein the one or more processors are further configured to cause the UE to:
receive, in system information, an indication of one or more parameters that indicate a first location of the first PDCCH repetition in the slot and a second location of the second PDCCH repetition in the slot.

12. The UE of claim 11, wherein the system information comprises system information block 1 (SIB1).

13. The UE of claim 1, wherein a quantity of blind decodes associated with the first PDCCH repetition and the second PDCCH repetition is limited on a per-slot basis.

14. The UE of claim 1, wherein the same CSS type comprises Type 0A, Type 1, or Type 2.

15. The UE of claim 1, wherein the first and second PDCCH repetitions are associated with a same downlink control information (DCI) format.

16. The UE of claim 1, wherein the first PDCCH repetition is located at a span in the slot, and wherein the second PDCCH repetition is located at a span that begins at a symbol following a final symbol of the span of the first PDCCH repetition in the slot.

17. The UE of claim 1, wherein the one or more processors are configured to cause the UE to:

perform one PDCCH decoding operation on the slot.

18. A network entity for wireless communication, comprising:

one or more memories; and one or more processors, coupled to the one or more memories, configured to cause the network entity to:

output a first physical downlink control channel (PDCCH) repetition of a PDCCH in a slot, the first PDCCH repetition being located in a first common search space (CSS); and output a second PDCCH repetition of the PDCCH in the slot, the second PDCCH repetition being located in a second CSS that is of a same CSS type as the first CSS, wherein the first CSS and the second CSS are linked via a search space linking identifier configured by radio resource control (RRC) signaling.

19. The network entity of claim 18, wherein the first PDCCH repetition is located in a first search space set and the second PDCCH repetition is located in a second search space set.

20. The network entity of claim 18, wherein the one or more processors are further configured to cause the network entity to:

output an indication of a parameter that identifies a quantity of PDCCH repetitions in the slot, wherein the PDCCH repetitions include the first PDCCH repetition and the second PDCCH repetition.

21. The network entity of claim 18, wherein an initial symbol of an initial span in the slot is a first reference symbol for PDCCH reception and a final symbol of a final span in the slot is a second reference symbol for the PDCCH reception.

22. The network entity of claim 18, wherein the one or more processors are further configured to cause the network entity to:

output, in system information, an indication of one or more parameters that indicate a first location of the first PDCCH repetition in the slot and a second location of the second PDCCH repetition in the slot.

23. The network entity of claim 18, wherein the slot is configured based on a minimum gap between a symbol of the first PDCCH repetition and a symbol of the second PDCCH repetition and further based on a maximum symbol duration of the first PDCCH repetition and the second PDCCH repetition.

24. The network entity of claim 18, wherein one or more of a quantity of non-overlapping control channel elements associated with the first PDCCH repetition and the second PDCCH repetition or a quantity of blind decodes associated with the first PDCCH repetition and the second PDCCH repetition are limited on a per-slot basis.

25. The network entity of claim 18, wherein the slot is configured based on one or more of:

a quantity of search space sets for the slot;

a variable related to a length of search space sets for the slot; or a symbol index of an initial symbol of the first PDCCH repetition or the second PDCCH repetition for the slot.

26. The network entity of claim 18, wherein a search space set in which the first PDCCH repetition and the second PDCCH repetition are located is configured for one or more of:

a plurality of cells;

a plurality of network entities configured to operate in a configured carrier frequency; or a serving cell for a user equipment.

27. The network entity of claim 18, wherein the one or more processors are further configured to cause the network entity to:

output, in system information, an indication of one or more parameters that indicate a first location of the first PDCCH repetition in the slot and a second location of the second PDCCH repetition in the slot.

28. A method of wireless communication performed by a user equipment (UE), comprising:

receiving a first physical downlink control channel (PDCCH) repetition of a PDCCH in a slot, the first PDCCH repetition being located in a first common search space (CSS); and receiving a second PDCCH repetition of the PDCCH in the slot, the second PDCCH repetition being located in a second CSS that is of a same CSS type as the first CSS, wherein the first CSS and the second CSS are linked via a search space linking identifier configured by radio resource control (RRC) signaling.

29. The method of claim 28, wherein the same CSS type comprises Type 0A, Type 1, or Type 2.

30. The method of claim 28, wherein the first and second PDCCH repetitions are associated with a same downlink control information (DCI) format.

31. The method of claim 28, wherein a quantity of blind decodes associated with the first PDCCH repetition and the second PDCCH repetition is limited on a per-slot basis.

32. The method of claim 28, further comprising performing one PDCCH decoding operation on the slot.

33. A method of wireless communication performed by a network entity, comprising:

outputting a first physical downlink control channel (PDCCH) repetition of a PDCCH in a slot, the first PDCCH repetition being located in a first common search space (CSS); and outputting a second PDCCH repetition of the PDCCH in the slot, the second PDCCH repetition being located in a second CSS that is of a same CSS type as the first CSS, wherein the first CSS and the second CSS are linked via a search space linking identifier configured by radio resource control (RRC) signaling.

* * * * *